United States Patent
Yoshikawa

(10) Patent No.: US 10,275,693 B2
(45) Date of Patent: Apr. 30, 2019

(54) LIQUID EJECTING APPARATUS AND LIQUID EJECTING METHOD

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/396,880

(22) Filed: Jan. 3, 2017

(65) Prior Publication Data

US 2017/0190191 A1 Jul. 6, 2017

(30) Foreign Application Priority Data

Jan. 5, 2016 (JP) ................... 2016-000396

(51) Int. Cl.
| | |
|---|---|
| *B41J 2/045* | (2006.01) |
| *G06K 15/10* | (2006.01) |
| *B41J 2/21* | (2006.01) |
| *B41J 2/205* | (2006.01) |
| *B41J 2/145* | (2006.01) |

(52) U.S. Cl.
CPC ........ *G06K 15/105* (2013.01); *B41J 2/04581* (2013.01); *B41J 2/145* (2013.01); *B41J 2/2054* (2013.01); *B41J 2/2132* (2013.01)

(58) Field of Classification Search
USPC ........................................ 347/41
See application file for complete search history.

(56) References Cited

U.S. PATENT DOCUMENTS

| | | | |
|---|---|---|---|
| 5,594,478 A | 1/1997 | Matsubara et al. | |
| 5,604,520 A | 2/1997 | Matsubara et al. | |
| 5,831,642 A | 11/1998 | Matsubara et al. | |
| 6,450,613 B1* | 9/2002 | Rietbergen | B41J 2/2139 347/19 |
| 2004/0051747 A1* | 3/2004 | Nunokawa | B41J 2/145 347/5 |
| 2004/0119767 A1 | 6/2004 | Takekoshi et al. | |

(Continued)

FOREIGN PATENT DOCUMENTS

| | | |
|---|---|---|
| JP | 05-031922 A | 2/1993 |
| JP | 2004-066821 A | 3/2004 |
| JP | 2009-137247 A | 6/2009 |

OTHER PUBLICATIONS

The Extended European Search Report for the corresponding European Patent Application No. 17150366.7 dated Sep. 13, 2017.

*Primary Examiner* — Shelby L Fidler

(57) ABSTRACT

A liquid ejecting apparatus includes a head in which a first nozzle group, a second nozzle group, and a third nozzle group which have a plurality of nozzles are disposed in a predetermined direction, and that can eject a liquid on a medium, a main scanning unit that scans the head in a main scanning direction, a sub scanning unit that relatively moves between the head and the medium in a sub scanning direction intersecting the main scanning direction; and a control unit. When the liquid is ejected to form a plurality of raster lines on the medium, the control unit maintains fixed values for each total value of a nozzle usage rate of the first nozzle group, total value of a nozzle usage rate of the second nozzle group, and total value of a nozzle usage rate of the third nozzle group, corresponding to the respective raster lines.

7 Claims, 15 Drawing Sheets

(56) References Cited

U.S. PATENT DOCUMENTS

| | | | |
|---|---|---|---|
| 2005/0073543 A1* | 4/2005 | Nishikori | B41J 2/2054 347/15 |
| 2005/0128229 A1* | 6/2005 | Shibata | B41J 2/145 347/6 |
| 2009/0256871 A1* | 10/2009 | Toyama | B41J 2/2107 347/7 |
| 2010/0060686 A1* | 3/2010 | Mitsuzawa | B41J 2/2125 347/12 |
| 2015/0054871 A1 | 2/2015 | Miyamoto et al. | |

\* cited by examiner

FIG. 3
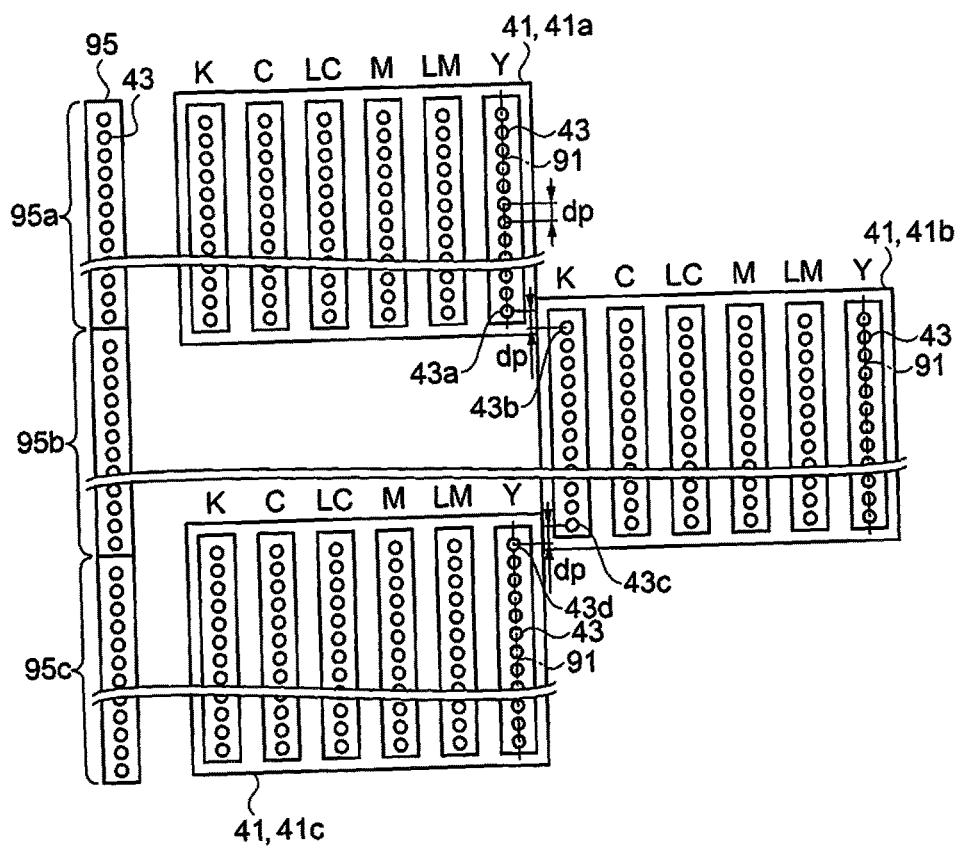
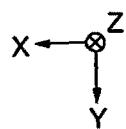

FIG. 4
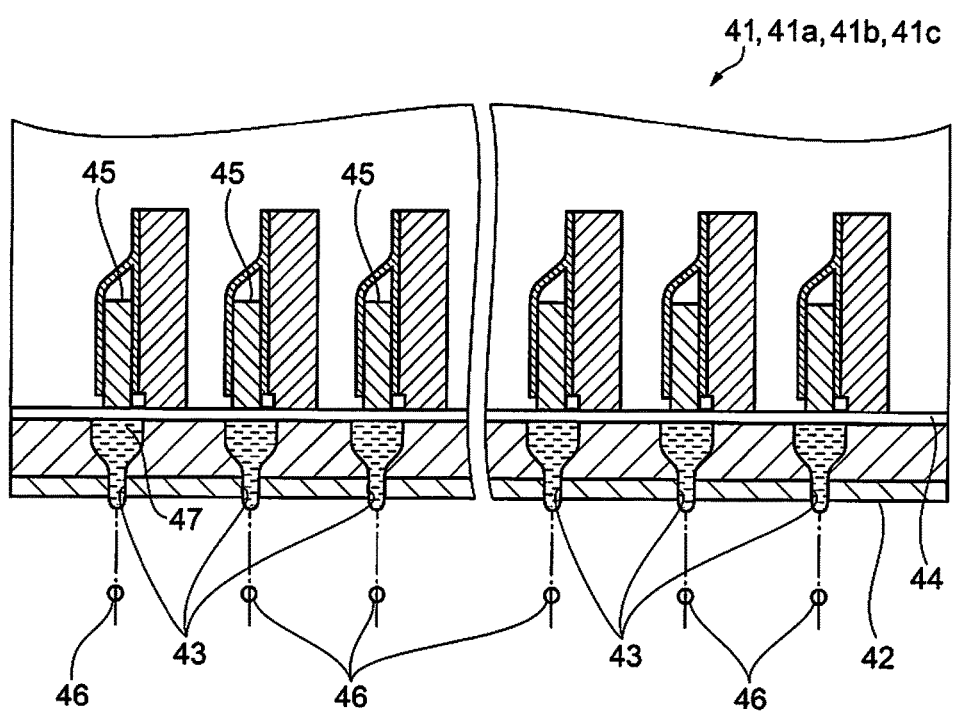
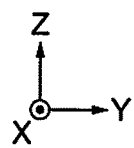

LIQUID EJECTING APPARATUS AND LIQUID EJECTING METHOD

BACKGROUND

1. Technical Field

The present invention relates to a liquid ejecting apparatus and a liquid ejecting method.

2. Related Art

In the related art, by alternately repeating a transportation operation that transports a medium in a transportation direction, and a dot forming operation that ejects liquid from a first nozzle and a second nozzle, while moving a first nozzle column in which a plurality of first nozzles are arranged in the transportation direction and a second nozzle column in which a plurality of second nozzles are arranged in the transportation direction in a movement direction to form a dot on the medium, a liquid ejecting apparatus that forms a plurality of dot columns configured of the dot arranged in the movement direction in the transportation direction is known (for example, refer to JP-A-2009-137247).

However, since the above apparatus has a deviation in a usage ratio of nozzles corresponding to the first nozzle column and the second nozzle column, there is a problem that a contrast unevenness of an image is easily visible, and an image quality is degraded.

SUMMARY

The invention can be realized in the following aspects or application examples.

Application Example 1

According to this application example, there is provided a liquid ejecting apparatus including a head in which a first nozzle group, a second nozzle group, and a third nozzle group which have a plurality of nozzles are disposed in a predetermined direction, and that can eject a liquid on a medium, a main scanning unit that scans the head in a main scanning direction, a sub scanning unit that relatively moves between the head and the medium in a sub scanning direction intersecting the main scanning direction; and a control unit. When the liquid is ejected to form a plurality of raster lines on the medium, the control unit maintains fixed values for each total value of a nozzle usage rate of the first nozzle group, total value of a nozzle usage rate of the second nozzle group, and total value of a nozzle usage rate of the third nozzle group, corresponding to the respective raster lines.

According to the configuration, since the total value of the nozzle usage rate of the first nozzle group corresponding to the respective raster lines formed is fixed, contrast in a plane of an image formed in the first nozzle group is uniform. Since the total value of the nozzle usage rate of the second nozzle group corresponding to the respective raster lines formed is fixed, contrast in a plane of an image formed in the second nozzle group is uniform. Since the total value of the nozzle usage rate of the third nozzle group corresponding to the respective raster lines formed is fixed, contrast in a plane of an image formed in the third nozzle group is uniform. Thereby, since the image formed by using the first nozzle group, the second nozzle group, and the third nozzle group is formed by combination of the image in which in-plane contrast is uniformized, contrast unevenness of the entire image is reduced. Thereby, it is possible to improve the image quality. The nozzle usage rate refers to a ratio of the number of liquid droplets (liquid) ejected from one nozzle in a scanning in the main scanning direction of one time of a total number of dots configuring the raster line.

Application Example 2

In the liquid ejecting apparatus according to the above application example, the total value of the nozzle usage rate of the first nozzle group, the total value of the nozzle usage rate of the second nozzle group, and the total value of the nozzle usage rate of the third nozzle group, corresponding to the respective raster lines are identical to each other.

According to the configuration, since the nozzle usage rate of the first nozzle group, the nozzle usage rate of the second nozzle group, and the nozzle usage rate of the third nozzle group are identical to each other in the respective raster lines, it is possible to further improve the image quality.

Application Example 3

In the liquid ejecting apparatus according to the above application example, the nozzle usage rate of the first nozzle group is fixed from a center of the first nozzle group to a predetermined position, and decreases from the predetermined position toward an end nozzle of the first nozzle group.

According to the configuration, by suppressing the nozzle usage rate of the end nozzle, it is possible to improve the ejection stability.

Application Example 4

In the liquid ejecting apparatus according to the above application example, the nozzle usage rate of the end nozzle is zero.

According to the configuration, it is possible to further improve the ejection stability.

Application Example 5

In the liquid ejecting apparatus according to the above application example, the head is further provided with a fourth nozzle group which has a plurality of the nozzles.

According to the configuration, the contrast unevenness of the image can be reduced, and productivity can be improved.

Application Example 6

According to this application example, there is provided a liquid ejecting method of a liquid ejecting apparatus including a head in which a first nozzle group, a second nozzle group, and a third nozzle group each having a plurality of nozzles capable of ejecting a liquid on a medium are disposed in a predetermined direction, a main scanning unit that scans the head in a main scanning direction, a sub scanning unit that relatively moves between the head and the medium in a sub scanning direction intersecting the main scanning direction, and a control unit. The method includes, when the liquid is ejected to form a plurality of raster lines on the medium, maintaining fixed values for each total value of a nozzle usage rate of the first nozzle group, total value of a nozzle usage rate of the second nozzle group, and total value of a nozzle usage rate of the third nozzle group, corresponding to the respective raster lines.

According to the configuration, since the total value of the nozzle usage rate of the first nozzle group corresponding to the respective raster lines formed is fixed, contrast in a plane of an image formed in the first nozzle group is uniform. Since the total value of the nozzle usage rate of the second nozzle group corresponding to the respective raster lines formed is fixed, contrast in a plane of an image formed in the second nozzle group is uniform. Since the total value of the nozzle usage rate of the third nozzle group corresponding to the respective raster lines formed is fixed, contrast in a plane of an image formed in the third nozzle group is uniform. Thereby, since the image formed by using the first nozzle group, the second nozzle group, and the third nozzle group is formed by combination of the image in which in-plane contrast is uniformized, contrast unevenness of the entire image is reduced. Thereby, it is possible to improve the image quality.

BRIEF DESCRIPTION OF THE DRAWINGS

The invention will be described with reference to the accompanying drawings, wherein like numbers reference like elements.

FIG. 3 is a schematic view illustrating the configuration of a head according to the first embodiment.

FIG. 4 is a cross-sectional view illustrating the configuration of the head according to the first embodiment.

DESCRIPTION OF EXEMPLARY EMBODIMENTS

Hereinafter, first and second embodiments of the invention will be described with reference to drawings. In the respective following drawings, to be a size capable of being identified respective layers and respective members, scales of the respective layers and the respective members are different from the actual scales of these.

Figure 2:
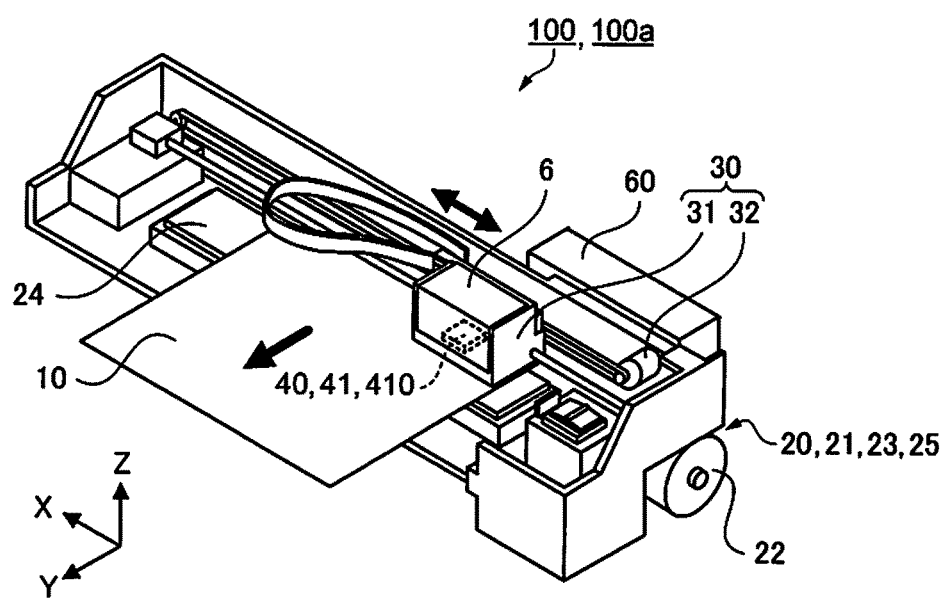
FIG. 2 is a perspective view illustrating the configuration of the liquid ejecting apparatus according to the first embodiment.

In FIGS. 2 and 3, for convenience of description, as three-axes orthogonal to each other, an X-axis, a Y-axis and a Z-axis are illustrated. The tip side of an arrow illustrating an axis direction is set to "+ side", and the base end side of the arrow is set to "− side". Hereinafter, a direction parallel to the X-axis is referred to as "X axis direction" or "main scanning direction", a direction parallel to the Y-axis is referred to as "Y axis direction" or "sub scanning direction", and a direction parallel to the Z-axis is referred to as "Z axis direction".

First Embodiment

Figure 1:
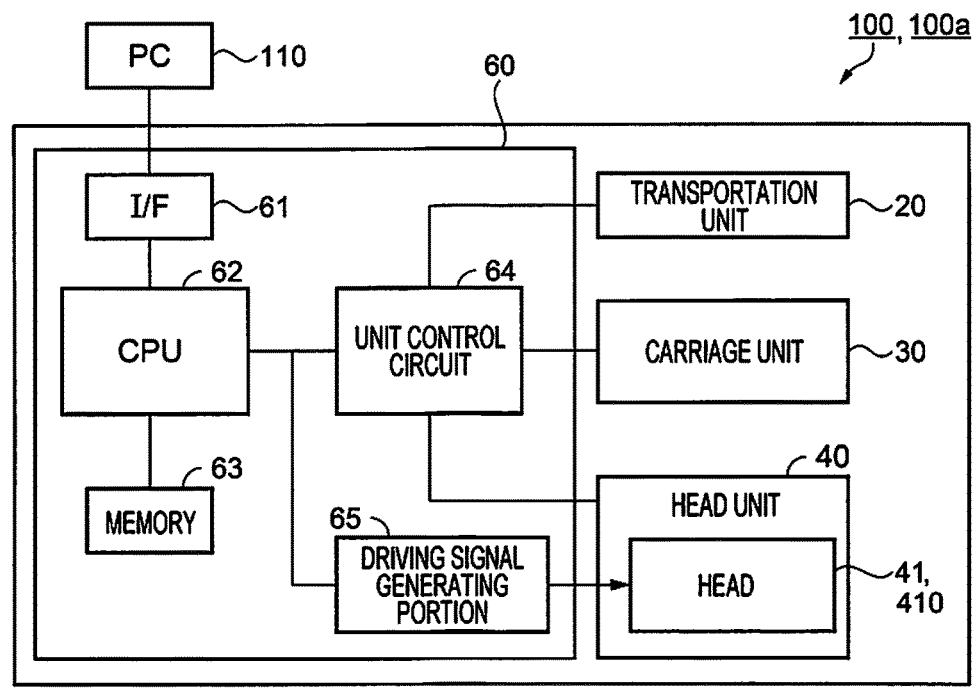
FIG. 1 is a block diagram illustrating a configuration of a liquid ejecting apparatus according to a first embodiment.

First, a configuration of a liquid ejecting apparatus will be described. FIG. 1 is a block diagram illustrating the configuration of the liquid ejecting apparatus, and FIG. 2 is a perspective view illustrating the configuration of the liquid ejecting apparatus. The liquid ejecting apparatus is provided with a head having a plurality of nozzles capable of ejecting liquid on a medium, a main scanning unit that scans the head in a main scanning direction, a sub scanning unit that relatively moves between the head and the medium in a sub scanning direction intersecting the main scanning direction, and a control unit. The liquid ejecting apparatus, for example, is an ink jet printer having a serial method. Hereinafter, a specific configuration of the liquid ejecting apparatus will be described.

The liquid ejecting apparatus 100 includes a transporting unit 20 as the sub scanning unit, a carriage unit 30 as the main scanning unit, a head unit 40, and a control unit 60. The liquid ejecting apparatus 100, for example, based on printing data (image forming data) received from a computer 110 functioning as an external device, controls respective units (transporting unit 20, carriage unit 30, head unit 40, and the like) by the control unit 60, and prints (forms an image) the image on a sheet 10 as the medium.

The carriage unit 30 is a scanning section causing a head 41 to scan (move) in a predetermined movement direction (X axis direction in illustrated in FIG. 2, hereinafter referred to as the main scanning direction). The carriage unit 30 includes a carriage 31 and a carriage motor 32. The carriage 31 holds the head 41 having a plurality of the nozzles 43 (refer to FIG. 3) capable of ejecting the ink as liquid on the sheet 10, and an ink cartridge 6. The ink cartridge 6 is a cartridge for storing the ink ejected from the head 41, and is detachably mounted on the carriage 31. The carriage 31 is capable of reciprocating in the main scanning direction, and is driven by the carriage motor 32. Thereby, the head 41 is moved in the main scanning direction (±X axis direction).

The transporting unit 20 is a transportation section for transporting (moving) the sheet 10 in the sub scanning direction (Y direction illustrated in FIG. 2) intersecting the main scanning direction. The transporting unit 20 includes a sheet feeding roller 21, a transportation motor 22, a transportation roller 23, a platen 24, and a sheet ejecting roller 25. The sheet feeding roller 21 is a roller for feeding the sheet 10 inserted into a sheet insertion port (not illustrated) to an inside of the liquid ejecting apparatus 100. The transportation roller 23 is a roller transporting the sheet 10 fed by the sheet feeding roller 21 up to a printable region, and is driven by the transportation motor 22. The platen 24 supports the sheet 10 during printing. The sheet ejecting roller 25 is a roller ejecting the sheet 10 to an outside of the liquid ejecting apparatus 100, and is disposed at a downstream side in the sub scanning direction with respect to the printable region.

The head unit 40 is a unit for ejecting the ink on the sheet 10 as liquid droplets (hereinafter, referred to as ink droplets). The head unit 40 is provided with the head 41 having a plurality of the nozzles 43. Since the head 41 is mounted on the carriage 31, if the carriage 31 moves in the main scanning direction, the head 41 also moves in the main scanning direction. The head 41 ejects the ink while moving in a main scanning direction. Therefore, dot columns (raster line) along the main scanning direction are formed on the sheet 10.

The control unit 60 is a unit for controlling the liquid ejecting apparatus 100. The control unit 60 includes an interface portion 61, a central processing unit (CPU) 62, a memory 63, a unit control circuit 64, and a driving signal generating portion 65. The interface portion 61 transmits and receives data between the computer 110 functioning as an external device and the liquid ejecting apparatus 100. The CPU 62 is an arithmetic processing unit for controlling the entire printer. The memory 63 is a memory for securing a region storing a program of the CPU 62 or a working region, and includes a storage element such as a random access memory (RAM) or an electrically erasable programmable read-only memory (EEPROM).

The CPU 62 controls the respective units (transporting unit 20, carriage unit 30, and head unit 40) via the unit control circuit 64 in accordance with the program stored in the memory 63. The driving signal generating portion 65 generates a driving signal for driving a piezoelectric element 45 (refer to FIG. 4) to eject the ink from a nozzle 43.

When printing, the control unit 60 moves the head 41 in the main scanning direction by the carriage 31 as the scanning section, while ejecting the ink from the nozzle 43 toward the sheet 10 as the medium. The operation is referred to as a "path". Thereby, the dot columns (raster line) formed along the main scanning direction is printed on the sheet 10. Next, the control unit 60 transports the sheet 10 in the sub scanning direction by the transporting unit 20 as the transportation section. By repeating the above operation by the control unit 60, the raster lines are aligned in the sub scanning direction of the sheet 10, and the image is formed on the sheet 10. In the embodiment, the sheet 10 is transported in the sub scanning direction with a narrower width than the width of the head 41 in the sub scanning direction. Therefore, a single raster line is formed with a plurality of the paths. This is referred to as n path printing (n: integer), and the path of n-th times is referred to as a "path n".

Next, a configuration of the head will be described. FIG. 3 is an explanatory view illustrating an example of the configuration of the head, and FIG. 4 is a cross-sectional view illustrating the configuration of the head.

In the embodiment, as illustrated in FIG. 3, a case configured of three heads 41 (first head 41a, second head 41b, and third head 41c) will be described. Nozzle columns 91 are provided for each ink color in each of the first head 41a, the second head 41b, and the third head 41c. In the embodiment, the nozzle columns 91 for each ink color of black (K), cyan (C), light cyan (LC), magenta (M), light magenta (LM), and yellow (Y) are provided. The respective nozzle columns 91 are provided with a plurality of the nozzles 43 aligned in the sub scanning direction with a fixed nozzle pitch dp. An end portion nozzles 43a of the nozzle columns 91 of the first head 41a, and the end portion nozzles 43b of the nozzle columns 91 of the second head 41b are shifted in the sub scanning direction only by the same size as the nozzle pitch dp in the nozzle columns 91. The other end portion nozzles 43c of the nozzle columns 91 of the second head 41b, and the end portion nozzles 43d of the nozzle columns 91 of the third head 41c are shifted in the sub scanning direction only by the same size as the nozzle pitch dp in the nozzle columns 91. In the embodiment, the first head 41a, the second head 41b, and the third head 41c are alternately (zigzag shape) arranged along the sub scanning direction. In this case, the nozzle columns for one color of three heads 41 (first head 41a, second head 41b, and third head 41c) are the same as that of the nozzle columns 95 (virtual nozzle columns illustrated in the left side of FIG. 3) having three times of the number of nozzles for one color of the single head 41. In the following description, a method performing a dot recording for one color will be described using the nozzle columns 95. The head 41 of the embodiment case has a configuration provided with a first nozzle group 95a having a plurality of nozzles 43 corresponding to the first head 41a are arrayed, a second nozzle group 95b having a plurality of nozzles 43 corresponding to the second head 41b are arrayed, and a third nozzle group 95c having a plurality of nozzles 43 corresponding to the third head 41c are arrayed in the nozzle columns 95. In the embodiment, the nozzle pitch dp and a pixel pitch on the printing medium P are equal to each other.

As illustrated in FIG. 4, the respective heads 41 are provided with a nozzle plate 42, and the nozzles 43 are formed on the nozzle plate 42. Cavities 47 communicating with the nozzles 43 are formed at a position which is an upper side of the nozzle plate 42 (+Z axis side) and facing the nozzle 43. The ink stored in the ink cartridge 6 is supplied into the cavity 47 of the head 41.

In an upper side of the cavity 47 (+Z axis side), a vibrating plate 44 to expand and contract volume of the cavity 47 by vibrating in a vertical direction (±Z axis direction), and the piezoelectric element 45 to vibrate the vibrating plate 44 by expanding and contracting in the vertical direction are disposed. The piezoelectric element 45 vibrates the vibrating plate 44 by expanding and contracting in the vertical direction, and the vibrating plate 44 expands and contracts the volume of the cavity 47. Therefore, the cavity 47 is pressured. Thereby, the pressure in the cavity 47 varies, and the ink supplied into the cavity 47 is adapted to be ejected as the ink droplets 46 through the nozzle 43.

In the embodiment, although a pressurizing section using the piezoelectric element 45 having a longitudinal vibration type is exemplified, it is not limited thereto. For example, the piezoelectric element having a deflection type formed by stacking the lower electrode, the piezoelectric layer, and the upper electrode may be used. As the pressure generating section, so-called an electrostatic actuator may be used to eject the ink droplets from the nozzle by generating static electricity between the vibrating plate and the electrode, and by deforming the vibration plate by electrostatic force. Furthermore, the head having a configuration to generate bubbles in the nozzle using a heating element and to eject the ink as the ink droplets by the bubble may be used.

Figure 5:
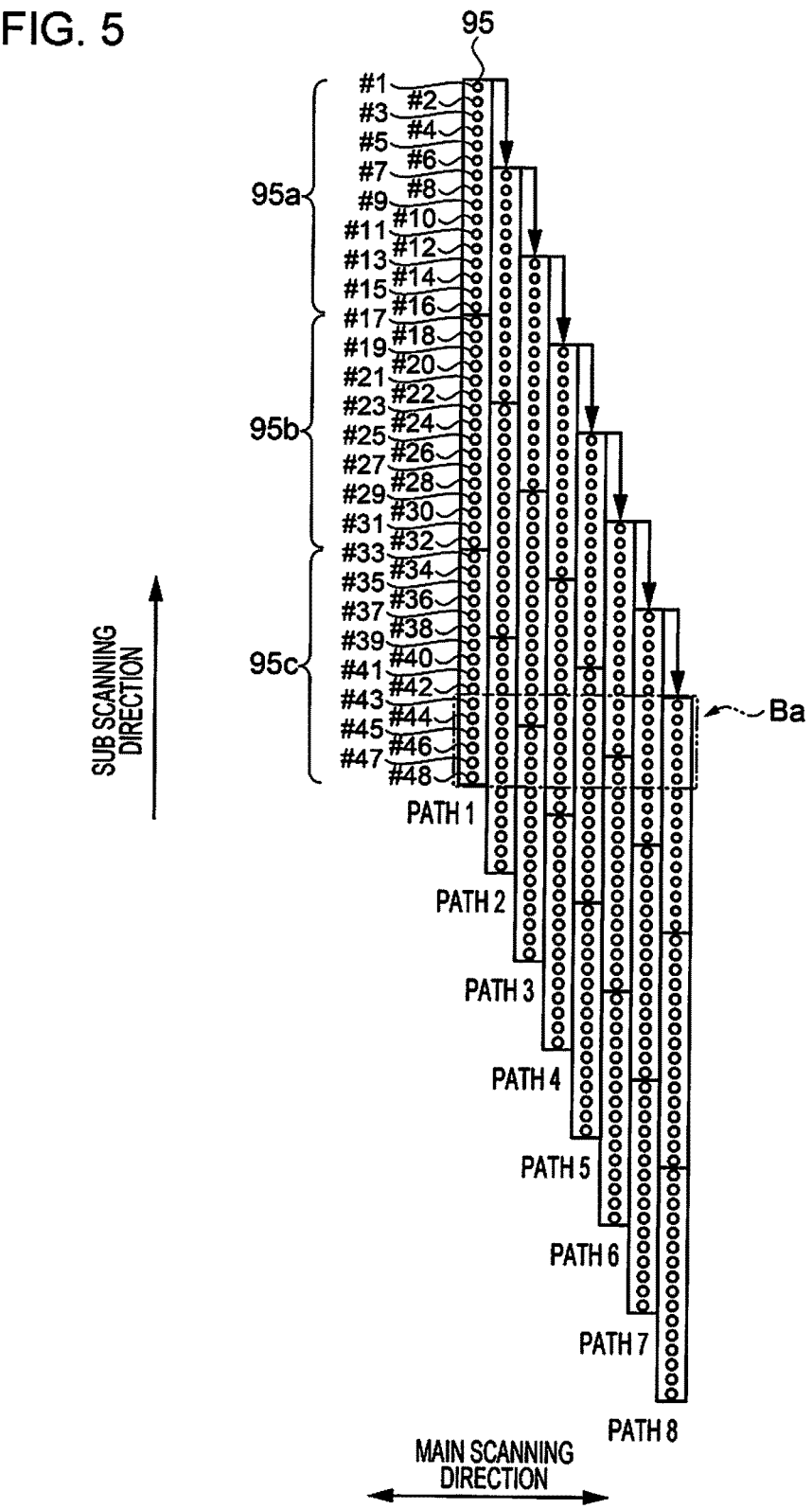
FIG. 5 is an explanatory view illustrating a formation processing method of an image according to the first embodiment.

Next, a liquid ejecting method (image forming processing method) will be described. FIG. 5 is an explanatory view illustrating the formation processing method of the image. Specifically, a relative positional relationship between the virtual nozzle columns 95 and the sheets at the time of respective dot forming operations are illustrated. When the liquid is ejected to form a plurality of raster lines on the medium, the liquid ejecting method is a method maintaining fixed values for each total value of a nozzle usage rate of the first nozzle group, total value of a nozzle usage rate of the second nozzle group, and total value of a nozzle usage rate of the third nozzle group, corresponding to the respective raster lines. In the embodiment, a case where the ink are ejected from the first nozzle group 95a, the second nozzle group 95b, and the third nozzle group 95c to form a plurality of the raster lines on the sheet will be described.

In the embodiment, as illustrated in FIG. 5, the virtual nozzle columns 95 (refer to FIG. 3) configured of the first nozzle group 95a, the second nozzle group 95b, and the third nozzle group 95c are described as an example. To simplify a description, the numbers of the nozzle 43 of the respective first to third nozzle groups 95a, 95b, and 95c are set to be 16 pieces. Specifically, a nozzle number of a nozzle 43 at a most upstream side in the sub scanning direction of the first nozzle group 95a is denoted as #1. The nozzle number is denoted in order along the downstream side in the sub scanning direction of the first nozzle group 95a. The nozzle number of the nozzle 43 at the most downstream side in the sub scanning direction of the first nozzle group 95a is denoted as #16. A nozzle number of a nozzle 43 at the most upstream side in the sub scanning direction of the second nozzle group 95b arranged at the downstream side in the sub scanning direction of the first nozzle group 95a is denoted as #17. The nozzle number is denoted in order along the downstream side in the sub scanning direction of the second nozzle group 95b. The nozzle number of the nozzle 43 at the most downstream side in the sub scanning direction of the second nozzle group 95b is denoted as #32. A nozzle number of a nozzle 43 at the most upstream side in the sub scanning direction of the third nozzle group 95c arranged at the downstream side in the sub scanning direction of the second nozzle group 95b is denoted as #33. The nozzle number is denoted in order along the downstream side in the sub scanning direction of the third nozzle group 95c. The nozzle number of the nozzle 43 at the most downstream side in the sub scanning direction of the third nozzle group 95c is denoted as #48.

The control unit 60 forms the raster lines by controlling the transporting unit 20, the carriage unit 30 as the main scanning unit, and the head unit 40. In the embodiment, a case where the raster lines are formed in the path 8 will be described.

In FIG. 5, although it is illustrated as if the nozzle columns 95 move with respect to the sheet, the sheet actually moves in a transportation direction. In the embodiment, in a transportation operation to be performed between the path and the path, the sheet is transported in the sub scanning direction so as to correspond to a transportation amount for six dots. A dot (image) is formed by the paths 1 to 8. Thereafter, similarly, the dot (image) is formed by the paths 2 to 9.

Here, the nozzle usage rates of the respective first to third nozzle groups 95a, 95b, and 95c in a band region Ba (refer to FIG. 6) according to the liquid ejecting method of the embodiment will be described. The band region Ba is a unit region having 6×8 pixels of the image formed by the path 8.

The nozzle usage rate of the first nozzle group 95a refers to a ratio of the number of dots of which the first nozzle group 95a contributes with respect to the total number of dots of a single raster line to be formed (for example, raster line L1). That is, it refers to the ratio of the number of dots of all the nozzles 43 of the first nozzle group 95a that contribute to the formation of the raster line L1.

Similarly, the nozzle usage rate of the second nozzle group 95b refers to a ratio of the number of dots of which the second nozzle group 95b contributes with respect to the total number of dots of a single raster line to be formed (for example, raster line L1). That is, it refers to the ratio of the number of dots of all the nozzles 43 of the second nozzle group 95b that contribute to the formation of the raster line L1.

Similarly, the nozzle usage rate of the third nozzle group 95c refers to a ratio of the number of dots of which the third nozzle group 95c contributes with respect to the total number of dots of a single raster line to be formed (for example, raster line L1). That is, it refers to the ratio of the number of dots of all the nozzles 43 of the third nozzle group 95c that contribute to the formation of the raster line L1.

Figure 6:
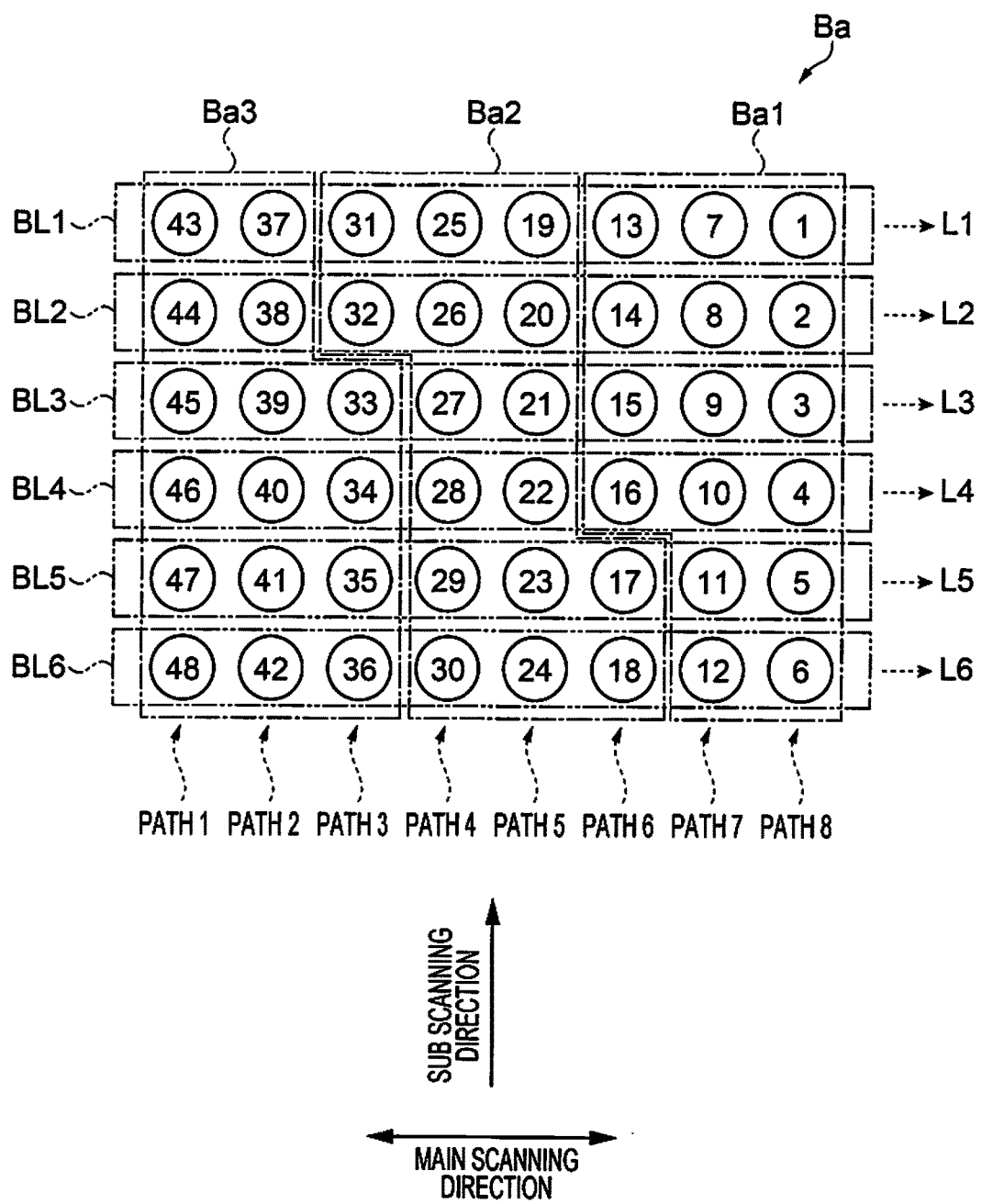
FIG. 6 is an explanatory view illustrating a corresponding nozzle in a band region according to the first embodiment.
Figure 7:
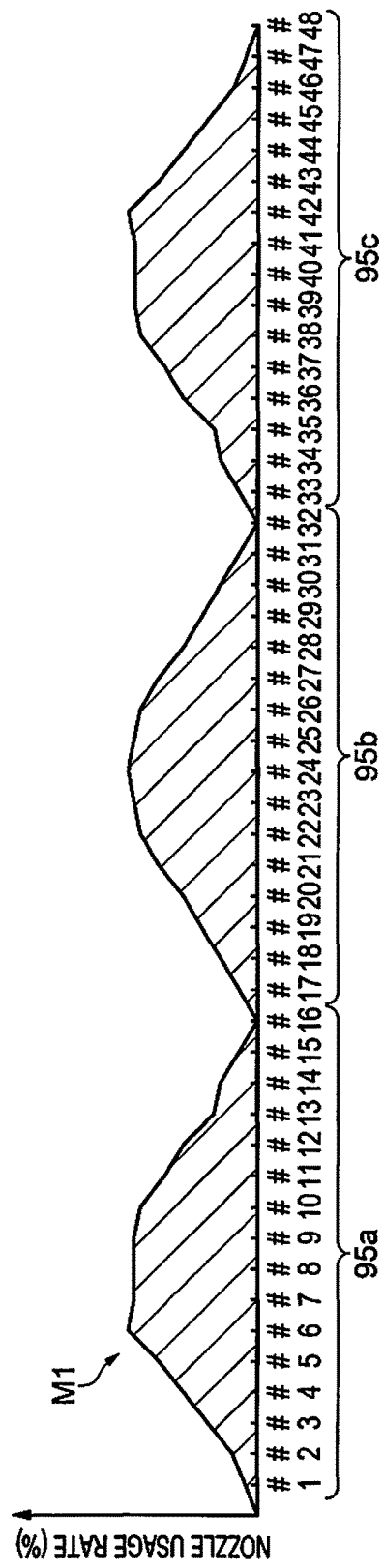
FIG. 7 is a view illustrating a mask pattern according to the first embodiment.
Figure 8:
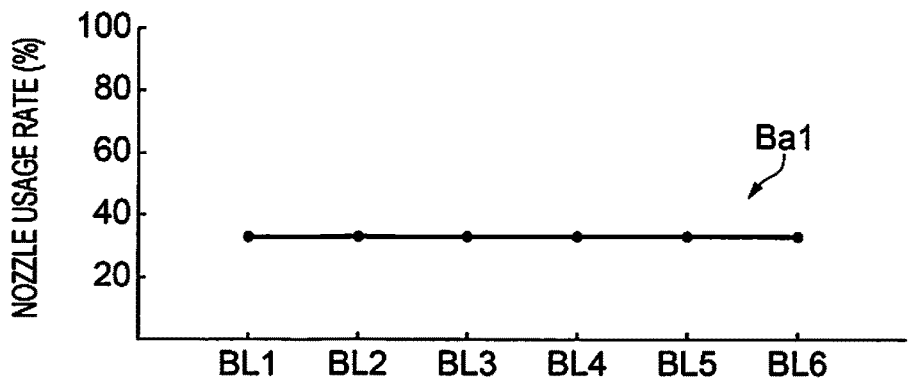
FIG. 8 is a view illustrating a nozzle usage rate of a first nozzle group in a first band region according to the first embodiment.
Figure 9:
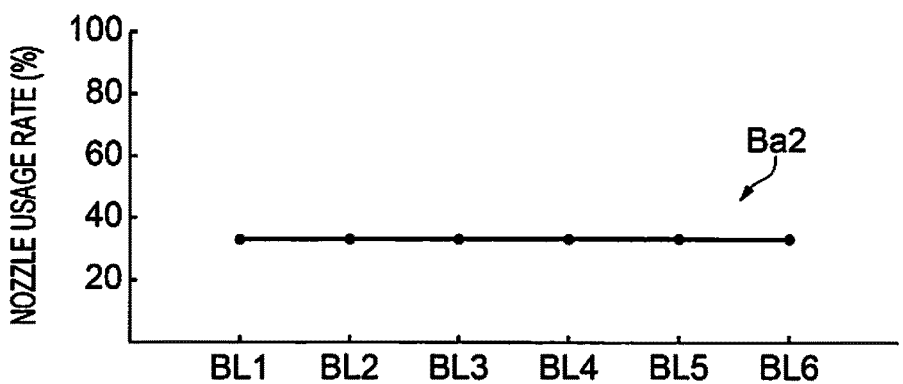
FIG. 9 is a view illustrating a nozzle usage rate of a second nozzle group in a second band region according to the first embodiment.
Figure 10:
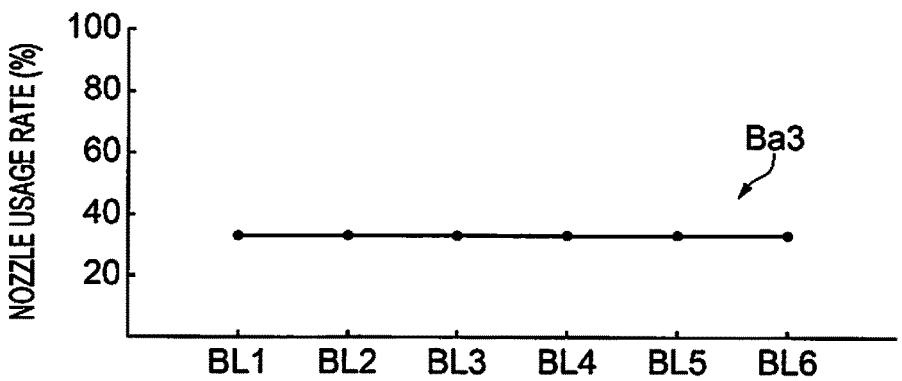
FIG. 10 is a view illustrating a nozzle usage rate of a third nozzle group in a third band region according to the first embodiment.

FIG. 6 is an explanatory view illustrating a corresponding nozzle in a band region, and FIG. 7 is a view illustrating a mask pattern. FIG. 8 is a view illustrating the nozzle usage rate of the first nozzle group in the band region, FIG. 9 is a view illustrating the nozzle usage rate of the second nozzle group in the band region, and FIG. 10 is a view illustrating the nozzle usage rate of the third nozzle group in the band region. In FIG. 6, the nozzles 43 (from nozzle numbers #1 to #48) of the first to third nozzle groups 95a, 95b, and 95c corresponding to the band region Ba are denoted.

As illustrated in FIGS. 5 and 6, the band region Ba is configured of a first band region Ba1 where the nozzles 43 (nozzle numbers #1 to #16) of the first nozzle group 95a corresponds, a second band region Ba2 where the nozzles 43 (nozzle numbers #17 to #32) of the second nozzle group 95b corresponds, and a third band region Ba3 where the nozzles 43 (nozzle numbers #33 to #48) of the third nozzle group 95c corresponds.

The raster line L1 is corresponded to a first band line BL1 in the main scanning direction. Here, the first band line BL1 is distributed to three nozzles 43 (nozzles #1, #7, and #13) of the first nozzle group 95a, three nozzles 43 (nozzles #19, #25, and #31) of the second nozzle group 95b, and two nozzles 43 (nozzles #37 and #43) of the third nozzle group 95c.

The raster line L2 is corresponded to a second band line BL2 in the main scanning direction. Here, the second band line BL2 is distributed to three nozzles 43 (nozzles #2, #8, and #14) of the first nozzle group 95a, three nozzles 43 (nozzles #20, #26, and #32) of the second nozzle group 95b, and two nozzles 43 (nozzles #38 and #44) of the third nozzle group 95c.

The raster line L3 is corresponded to a third band line BL3 in the main scanning direction. Here, the third band line BL3 is distributed to three nozzles 43 (nozzles #3, #9, and #15) of the first nozzle group 95a, two nozzles 43 (nozzles #21 and #27) of the second nozzle group 95b, and three nozzles 43 (nozzles #33, #39, and #45) of the third nozzle group 95c.

The raster line L4 is corresponded to a fourth band line BL4 in the main scanning direction. Here, the fourth band line BL4 is distributed to three nozzles 43 (nozzles #4, #10, and #16) of the first nozzle group 95a, two nozzles 43 (nozzles #22 and #28) of the second nozzle group 95b, and three nozzles 43 (nozzles #34, #40, and #46) of the third nozzle group 95c.

The raster line L5 is corresponded to a fifth band line BL5 in the main scanning direction. Here, the fifth band line BL5 is distributed to two nozzles 43 (nozzles #5 and #11) of the first nozzle group 95a, three nozzles 43 (nozzles #17, #23, and #29) of the second nozzle group 95b, and three nozzles 43 (nozzles #35, #41, and #47) of the third nozzle group 95c.

The raster line L6 is corresponded to a sixth band line BL6 in the main scanning direction. Here, the sixth band line BL6 is distributed to two nozzles 43 (nozzles #6 and #12) of the first nozzle group 95a, three nozzles 43 (nozzles #18, #24, and #30) of the second nozzle group 95b, and three nozzles 43 (nozzles #36, #42, and #48) of the third nozzle group 95c.

When the liquid is ejected from the first nozzle group 95a, the second nozzle group 95b, and the third nozzle group 95c forming the band region Ba to form a plurality of the raster lines (from the raster line L1 to the raster line L6) on the sheet 10, the control unit 60 maintains fixed values for the total value of the nozzle usage rate of the first nozzle group 95a corresponding to the respective raster lines (from the raster line L1 to the raster line L6), and maintains fixed values for the total value of the nozzle usage rate of the second nozzle group 95b corresponding to the respective raster lines (from the raster line L1 to the raster line L6), based on the mask pattern M1 as illustrated in FIG. 7. Furthermore, the control unit 60 maintains fixed values for the total value of the nozzle usage rate of the third nozzle group 95c corresponding to the respective raster lines (from the raster line L1 to the raster line L6). The mask pattern M1 is a pattern the nozzle usage rate is allocated to each nozzle 43 (from nozzle #1 to nozzle #48). Further in detail, it is obtained by defining the nozzle usage rate of the respective nozzles 43 (from nozzle #1 to nozzle #48), based on an appearance ratio of the nozzles 43 of the respective first to third nozzle groups 95a, 95b, and 95c which appears for the respective raster lines (from the raster line L1 to the raster line L6). Here, in the mask pattern M1, the nozzle usage rate of the first nozzle group 95a is set to decrease toward end nozzles (nozzle #1 and nozzle #16). Similarly, the nozzle usage rate of the second nozzle group 95b is set to decrease toward end nozzles (nozzle #17 and nozzle #32). Similarly, the nozzle usage rate of the third nozzle group 95c is set to decrease toward end nozzles (nozzle #33 and nozzle #48). This is to ensure ejection stability. The nozzle usage rate of the end nozzles (nozzle #1 and nozzle #16) of the first nozzle group 95a may be set to zero. Furthermore, it is possible to improve the ejection stability. The nozzle usage rates of the end nozzles (nozzle #17 and nozzle #32, and nozzle #33 and nozzle #48) of the second and third nozzle groups 95b and 95c may be set to zero in the same manner.

In the embodiment, as illustrated in FIG. 8, the nozzle usage rate of the first nozzle group 95a in the first band region Ba1 and the total value of the nozzle usage rate in the first band line BL1 to the sixth band line BL6 are fixed. In the embodiment, the total values of the nozzle usage rate of the respective band lines BL (first band line BL1 to the sixth band line BL6) are approximately 33% and fixed.

In detail, the total value of the nozzle usage rate of three nozzles 43 (nozzles #1, #7, and #13) of the first nozzle group 95a corresponding to the first band line BL1 is approximately 33%.

The total value of the nozzle usage rate of three nozzles 43 (nozzles #2, #8, and #14) of the first nozzle group 95a corresponding to the second band line BL2 is approximately 33%.

The total value of the nozzle usage rate of three nozzles 43 (nozzles #3, #9, and #15) of the first nozzle group 95a corresponding to the third band line BL3 is approximately 33%.

The total value of the nozzle usage rate of three nozzles 43 (nozzles #4, #10, and #16) of the first nozzle group 95a corresponding to the fourth band line BL4 is approximately 33%.

The total value of the nozzle usage rate of two nozzles 43 (nozzles #5 and #11) of the first nozzle group 95a corresponding to the fifth band line BL5 is approximately 33%.

The total value of the nozzle usage rate of two nozzles 43 (nozzles #6 and #12) of the first nozzle group 95a corresponding to the sixth band line BL6 is approximately 33%.

According to the above, in the first band region Ba1 (refer to FIG. 6) configuring by the first band line BL1 to the sixth band line BL6 to which the first nozzle group 95a corresponds, since the total value of the nozzle usage rate is 33% and fixed, in-plane contrast of the image formed in the first nozzle group 95a is uniform. As illustrated in FIG. 8, the total values of the nozzle usage rate of the nozzles 43 of the first nozzle group 95a corresponding to the respective first to sixth band lines BL1, BL2, BL3, BL4, BL5, and BL6 are also mentioned to be identical to each other.

As illustrated in FIG. 9, the nozzle usage rate of the second nozzle group 95b in the second band region Ba2 and the total value of the nozzle usage rate in the first band line BL1 to the sixth band line BL6 are fixed. In the embodiment, the total value of the nozzle usage rate of the respective band lines BL (from first band line BL1 to sixth band line BL6) is approximately 33% and fixed.

In detail, the total value of the nozzle usage rate of three nozzles 43 (nozzles #19, #25, and #31) of the second nozzle group 95b corresponding to the first band line BL1 is approximately 33%.

The total value of the nozzle usage rate of three nozzles 43 (nozzles #20, #26, and #32) of the second nozzle group 95b corresponding to the second band line BL2 is approximately 33%.

The total value of the nozzle usage rate of two nozzles 43 (nozzles #21, and #27) of the second nozzle group 95b corresponding to the third band line BL3 is approximately 33%.

The total value of the nozzle usage rate of two nozzles 43 (nozzles #22, and #28) of the second nozzle group 95b corresponding to the fourth band line BL4 is approximately 33%.

The total value of the nozzle usage rate of three nozzles 43 (nozzles #17, #23, and #29) of the second nozzle group 95b corresponding to the fifth band line BL5 is approximately 33%.

The total value of the nozzle usage rate of three nozzles 43 (nozzles #18, #24, and #30) of the second nozzle group 95b corresponding to the sixth band line BL6 is approximately 33%.

According to the above, in the second band region Ba2 (refer to FIG. 6) configuring by the first band line BL1 to the sixth band line BL6 to which the second nozzle group 95b corresponds, since the total value of the nozzle usage rate is 33% and fixed, in-plane contrast of the image formed in the second nozzle group 95b is uniform. As illustrated in FIG. 9, the total value of the nozzle usage rate of the nozzle 43 of the second nozzle group 95b corresponding to the respective first to sixth band lines BL1, BL2, BL3, BL4, BL5, and BL6 is also mentioned to be identical to each other.

As illustrated in FIG. 10, the nozzle usage rate of the third nozzle group 95c in the third band region Ba3 and the total value of the nozzle usage rate in the first band line BL1 to the sixth band line BL6 are fixed. In the embodiment, the total value of the nozzle usage rate of the respective band lines BL (first band line BL1 to sixth band line BL6) is approximately 33% and fixed.

In detail, the total value of the nozzle usage rate of two nozzles 43 (nozzles #37 and #43) of the third nozzle group 95c corresponding to the first band line BL1 is approximately 33%.

The total value of the nozzle usage rate of two nozzles 43 (nozzles #38 and #44) of the third nozzle group 95c corresponding to the second band line BL2 is approximately 33%.

The total value of the nozzle usage rate of three nozzles 43 (nozzles #33, #39, and #45) of the third nozzle group 95c corresponding to the third band line BL3 is approximately 33%.

The total value of the nozzle usage rate of three nozzles 43 (nozzles #34, #40, and #46) of the third nozzle group 95c corresponding to the fourth band line BL4 is approximately 33%.

The total value of the nozzle usage rate of three nozzles 43 (nozzles #35, #41, and #47) of the third nozzle group 95c corresponding to the fifth band line BL5 is approximately 33%.

The total value of the nozzle usage rate of three nozzles 43 (nozzles #36, #42, and #48) of the third nozzle group 95c corresponding to the sixth band line BL6 is approximately 33%.

According to the above, in the third band region Ba3 (refer to FIG. 6) configuring by the first band line BL1 to the sixth band line BL6 to which the third nozzle group 95c corresponds, since the total value of the nozzle usage rate is 33% and fixed, in-plane contrast of the image formed in the third nozzle group 95c is uniform. As illustrated in FIG. 10, the total value of the nozzle usage rate of the nozzle 43 of the third nozzle group 95c corresponding to the respective first to sixth band lines BL1, BL2, BL3, BL4, BL5, and BL6 is also mentioned to be identical to each other.

Hereinbefore, since the total value of the respective nozzle usage rates is identical to each other in the respective first to third band regions Ba1, Ba2, and Ba3, and since the in-plane contrast is formed by combination of the uniformized image, contrast unevenness is hardly visible in the image formed by the band region Ba configuring of the first to third band regions Ba1, Ba2, and Ba3.

In the embodiment, in the respective first to third band regions Ba1, Ba2, and Ba3, the total value of the respective nozzle usage rates is fixed, and the total value of the nozzle usage rate of the first nozzle group 95a corresponding to the respective raster lines (from the raster line L1 to the raster line L6) and the total value of the nozzle usage rate of the second nozzle group 95b corresponding to the respective raster lines (from the raster line L1 to the raster line L6) are identical to each other. Furthermore, the total value of the nozzle usage rate of the third nozzle group 95c corresponding to the respective raster lines (from the raster line L1 to the raster line L6) is identical to each other.

Specifically, the total value of the nozzle usage rate of three nozzles 43 (nozzles #1, #7, and #13) of the first nozzle group 95a of the first band line BL1 corresponding to the raster line L1 is approximately 33%, the total value of the nozzle usage rate of three nozzles 43 (nozzles #19, #25, and #31) of the second nozzle group 95b corresponding to the first band line BL1 is approximately 33%, the total value of the nozzle usage rate of two nozzles 43 (nozzles #37 and #43) of the third nozzle group 95c corresponding to the first band line BL1 is approximately 33%, and the total values of the nozzle usage rate of the respective first to third nozzle groups 95a, 95b, and 95c are identical to each other in the first band line BL1 corresponding to the raster line L1. The total value of the nozzle usage rate of the nozzles 43 of the respective first to third nozzle groups 95a, 95b, and 95c corresponding to the first band line BL1 corresponding to the raster line L1 is also mentioned to be fixed.

The total value of the nozzle usage rate of three nozzles 43 (nozzles #2, #8, and #14) of the first nozzle group 95a of the second band line BL2 corresponding to the raster line L2 is approximately 33%, the total value of the nozzle usage rate of three nozzles 43 (nozzles #20, #26, and #32) of the second nozzle group 95b corresponding to the second band line BL2 is approximately 33%, the total value of the nozzle usage rate of two nozzles 43 (nozzles #38 and #44) of the third nozzle group 95c corresponding to the second band line BL2 is approximately 33%, and the total values of the nozzle usage rate of the respective first to third nozzle groups 95a, 95b, and 95c are identical to each other in the second band line BL2 corresponding to the raster line L2. The total value of the nozzle usage rate of the nozzles 43 of the respective first to third nozzle groups 95a, 95b, and 95c corresponding to the second band line BL2 corresponding to the raster line L2 is also mentioned to be fixed.

The total value of the nozzle usage rate of three nozzles 43 (nozzles #3, #9, and #15) of the first nozzle group 95a of the third band line BL3 corresponding to the raster line L3 is approximately 33%, the total value of the nozzle usage rate of two nozzles 43 (nozzles #21 and #27) of the second nozzle group 95b corresponding to the third band line BL3 is approximately 33%, the total value of the nozzle usage rate of three nozzles 43 (nozzles #33, #39, and #45) of the third nozzle group 95c corresponding to the third band line BL3 is approximately 33%, and the total values of the nozzle usage rate of the respective first to third nozzle groups 95a, 95b, and 95c are identical to each other in the third band line BL3 corresponding to the raster line L3. The total values of the nozzle usage rate of the nozzles 43 of the respective first to third nozzle groups 95a, 95b, and 95c corresponding to the third band line BL3 corresponding to the raster line L3 are also mentioned to be fixed.

The total value of the nozzle usage rate of three nozzles 43 (nozzles #4, #10, and #16) of the first nozzle group 95a of the fourth band line BL4 corresponding to the raster line L4 is approximately 33%, the total value of the nozzle usage rate of two nozzles 43 (nozzles #22 and #28) of the second nozzle group 95b corresponding to the fourth band line BL4 is approximately 33%, the total value of the nozzle usage rate of three nozzles 43 (nozzles #34, #40, and #46) of the third nozzle group 95c corresponding to the fourth band line BL4 is approximately 33%, and the total values of the nozzle usage rate of the respective first to third nozzle groups 95a, 95b, and 95c are identical to each other in the fourth band line BL4 corresponding to the raster line L4. The total value of the nozzle usage rate of the nozzles 43 of the respective first to third nozzle groups 95a, 95b, and 95c corresponding to the fourth band line BL4 corresponding to the raster line L4 is also mentioned to be fixed.

The total value of the nozzle usage rate of two nozzles 43 (nozzles #5 and #11) of the first nozzle group 95a of the fifth band line BL5 corresponding to the raster line L5 is approximately 33%, the total value of the nozzle usage rate of three nozzles 43 (nozzles #17, #23, and #29) of the second nozzle group 95b corresponding to the fifth band line BL5 is approximately 33%, the total value of the nozzle usage rate of three nozzles 43 (nozzles #35, #41, and #47) of the third nozzle group 95c corresponding to the fifth band line BL5 is approximately 33%, and the total values of the nozzle usage rate of the respective first to third nozzle groups 95a, 95b, and 95c are identical to each other in the fifth band line BL5 corresponding to the raster line L5. The total value of the nozzle usage rate of the nozzles 43 of the respective first to third nozzle groups 95a, 95b, and 95c corresponding to the fifth band line BL5 corresponding to the raster line L5 is also mentioned to be fixed.

The total value of the nozzle usage rate of two nozzles 43 (nozzles #6 and #12) of the first nozzle group 95a of the sixth band line BL6 corresponding to the raster line L6 is approximately 33%, the total value of the nozzle usage rate of three nozzles 43 (nozzles #18, #24, and #30) of the second nozzle group 95b corresponding to the sixth band line BL6 is approximately 33%, the total value of the nozzle usage rate of three nozzles 43 (nozzles #36, #42, and #48) of the third nozzle group 95c corresponding to the sixth band line BL6 is approximately 33%, and the total values of the nozzle usage rate of the respective first to third nozzle groups 95a, 95b, and 95c are identical to each other in the sixth band line BL6 corresponding to the raster line L6. The total value of the nozzle usage rate of the nozzles 43 of the respective first to third nozzle groups 95a, 95b, and 95c corresponding to the sixth band line BL6 corresponding to the raster line L6 is also mentioned to be fixed.

According to the above, the total value of the nozzle usage rate of the nozzle 43 of the first nozzle group 95a, the total value of the nozzle usage rate of the nozzle 43 of the second nozzle group 95b, and the total values of the nozzle usage rate of the nozzle 43 of the third nozzle group 95c are identical to each other in the respective raster lines (from the raster line L1 to the raster line L6). That is, the total value of the nozzle usage rate of the respective first to third nozzle groups 95a, 95b, and 95c is fixedly (uniformly) distributed with respect to the respective raster lines. Thereby, it is possible to further improve image quality.

Figure 11:
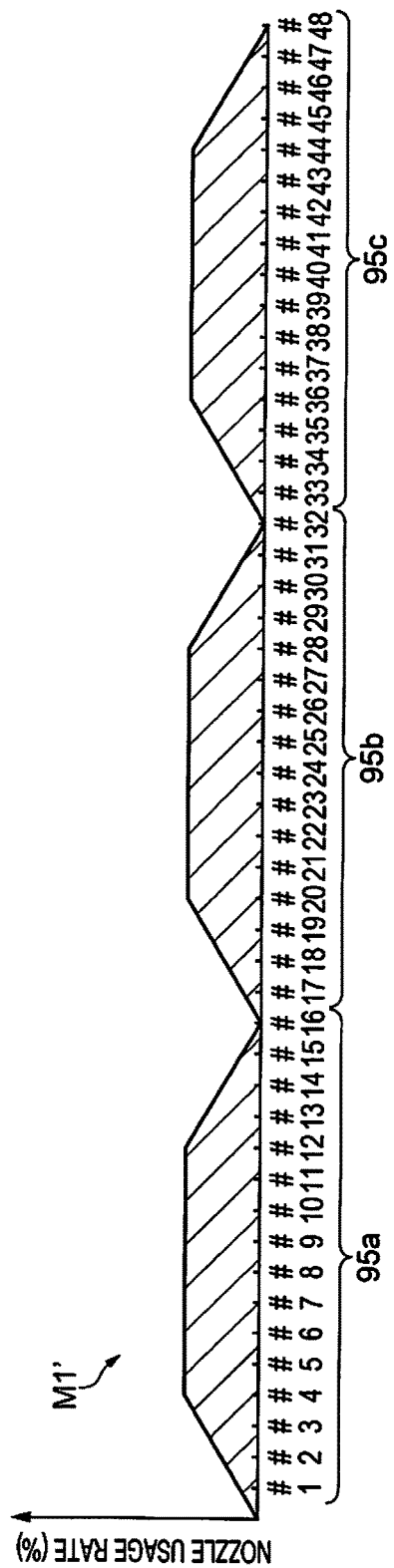
FIG. 11 is a view illustrating an example of another mask pattern according to the first embodiment.

The configuration of the mask pattern M1 as illustrated in the embodiment is not particularly limited. The following illustrates an example of another mask pattern. FIG. 11 is a view illustrating the example of another mask pattern. As illustrated in FIG. 11, the mask pattern M1' of the example is also the mask pattern in which the total value of the nozzle usage rate of the first nozzle group 95a is fixed, and the total value of the nozzle usage rate of the second nozzle group 95b is fixed, furthermore, the total value of the nozzle usage rate of the third nozzle group 95c is fixed, and is a pattern that assigns the nozzle usage rate for each the nozzle 43 (from nozzle #1 to nozzle #48). By ejecting the ink from the respective nozzles 43 (from nozzle #1 to nozzle #48) based on the mask pattern M1', it is possible to obtain the same effect described-above. Here, the nozzle usage rate of the first nozzle group 95a is fixed from the center of the first nozzle group 95a to a predetermined position, and the mask pattern M1' is set to decrease from the predetermined position toward the end nozzle (nozzle #1 and nozzle #16) of the first nozzle group 95a. This is to ensure the ejection stability. The mask pattern M1' and the mask pattern M1' may combine. For example, it is possible to apply by replacing a portion corresponding to the second nozzle group 95b of the mask pattern M1' and a portion corresponding to the second nozzle group 95b of the mask pattern M1'. That is, it is possible to combine for each nozzle group unit. Even in this case, it is possible to obtain the same effect described-above. Furthermore, the mask pattern of another embodiment may be applied. That is, if it is the mask pattern in which the total value of the nozzle usage rate of the first nozzle group 95a is fixed, the total value of the nozzle usage rate of the second nozzle group 95b is fixed, and the total value of the nozzle usage rate of the third nozzle group 95c is fixed, it is not limited thereto.

Hereinbefore, according to the above embodiment, it is possible to obtain the following effects.

Since the total value of the nozzle usage rate in the respective first to third band regions Ba1, Ba2, and Ba3 in the band region Ba is fixed, the image formed by the band region Ba has fixed density. Therefore, the contrast unevenness is hardly visible. Since the total values of the nozzle usage rate of the respective first to third band regions Ba1, Ba2, and Ba3 are identical to each other, it is possible to further improve the image quality. For example, even in a case where positions between the respective first to third heads 41a, 41b, and 41c are shifted, since the total value of the nozzle usage rate in the respective first to third band regions Ba1, Ba2, and Ba3 is fixed, the in-plane combination in which the image is formed is equal. Therefore, it is possible to reduce the contrast unevenness of the image.

Second Embodiment

Next, a second embodiment will be described. Since a basic configuration of a liquid ejecting apparatus 100a of the embodiment is the same as the configuration of the liquid ejecting apparatus 100 of the first embodiment, a description of the basic configuration will be omitted (refer to FIGS. 1 and 2). Hereinafter, the configuration different from the first embodiment will be described. Specifically, although the first embodiment has the configuration provided with three heads 41, the configuration further provided with a fourth nozzle group having a plurality of the nozzles, that is, provided with four heads will be described in the embodiment.

Figure 12:
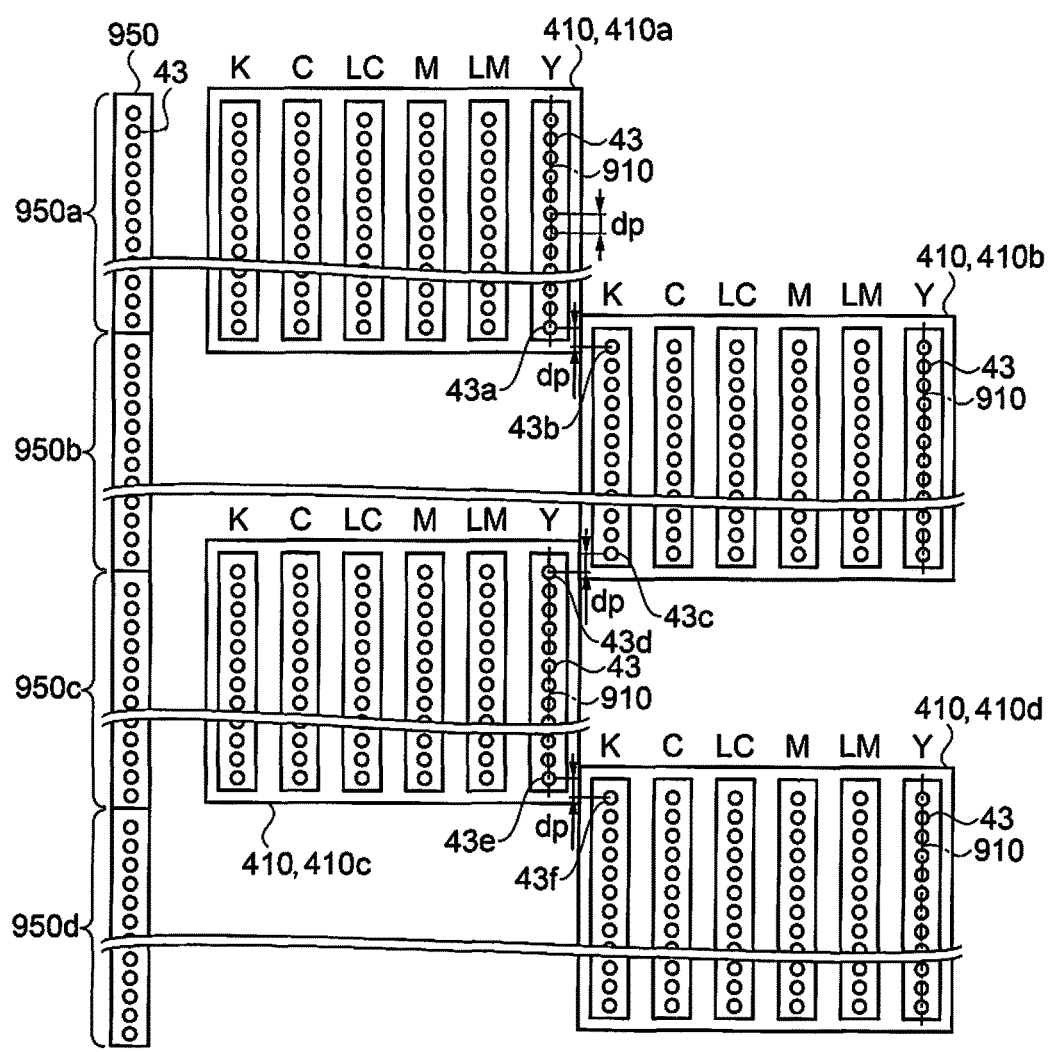
FIG. 12 is a block diagram illustrating a configuration of a head according to a second embodiment.

First, a configuration of a head will be described. FIG. 12 is an explanatory view illustrating an example of the configuration of the head. As illustrated in FIG. 12, the apparatus is configured of four heads 410 (first head 410a, second head 410b, third head 410c, and fourth head 410d). Nozzle columns 910 are provided for each ink color in each of the first head 410a, the second head 410b, the third head 410c, and the fourth head 410d. In the embodiment, the nozzle columns 910 for each ink color of black (K), cyan (C), light cyan (LC), magenta (M), light magenta (LM), and yellow (Y) are provided. The respective nozzle columns 910 are provided with a plurality of the nozzles 43 aligned in the sub scanning direction with a fixed nozzle pitch dp. End portion nozzles 43a of the nozzle columns 910 of the first head 410a, and the end portion nozzles 43b of the nozzle columns 910 of the second head 410b are shifted in the sub scanning direction only by the same size as the nozzle pitch dp in the nozzle columns 910. The other end portion nozzles 43c of the nozzle columns 910 of the second head 410b, and the end portion nozzles 43d of the nozzle columns 910 of the third head 410c are shifted in the sub scanning direction only by the same size as the nozzle pitch dp in the nozzle columns 910. The other end portion nozzles 43e of the nozzle columns 910 of the third head 410c, and the end portion nozzles 43f of the nozzle columns 910 of the fourth head 410d are shifted in the sub scanning direction only by the same size as the nozzle pitch dp in the nozzle columns 910. In the embodiment, the first head 410a, the second head 410b, the third head 410c, and the fourth head 410d are alternately (zigzag shape) arranged along the sub scanning direction. In this case, the nozzle columns for one color of four heads 410 (first head 410a, second head 410b, third head 410c, and fourth head 410d) are the same as that of the nozzle columns 950 (virtual nozzle columns illustrated in the left side oh FIG. 12) having four times of the number of nozzles for one color of a single head 410. In the following description, a method performing a dot recording for one color will be described using the nozzle columns 950. The head 410 of the embodiment case has a configuration provided with a first nozzle group 950a having a plurality of nozzles 43 corresponding to the first head 410a are arrayed, a second nozzle group 950b having a plurality of nozzles 43 corresponding to the second head 410b are arrayed, a third nozzle group 950c having a plurality of nozzles 43 corresponding to the third head 410c, and a fourth nozzle group 950d having a plurality of nozzles 43 corresponding to the fourth head 410d are arrayed in the nozzle columns 950. In the embodiment, the nozzle pitch and a pixel pitch on the printing medium P are equal to each other. Since a configuration of the head is the same as that of the first embodiment, a description of the configuration will be omitted (refer to FIG. 4).

Figure 13:
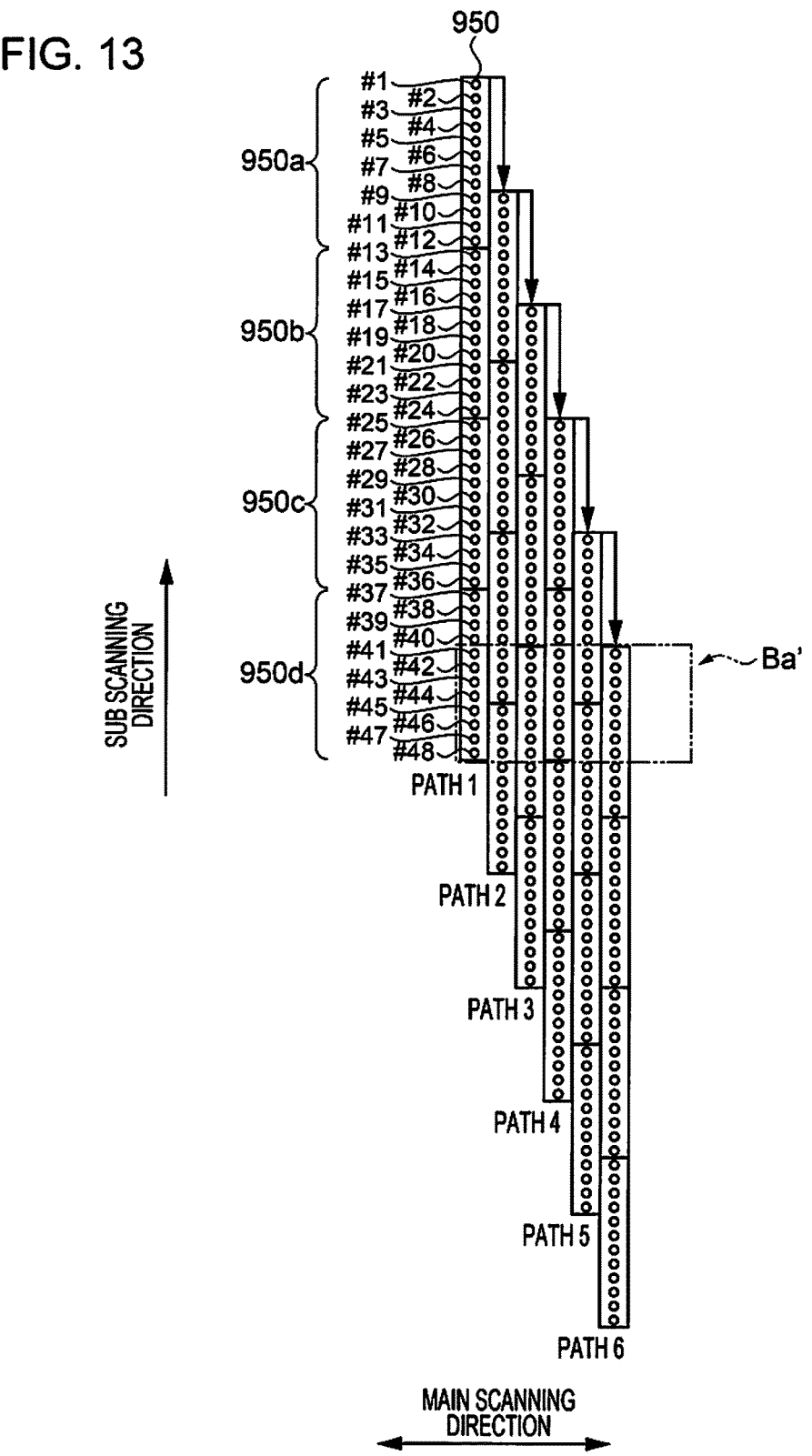
FIG. 13 is an explanatory view illustrating a formation processing method of an image according to the second embodiment.

Next, a liquid ejecting method (formation processing method of the image) will be described. FIG. 13 is an explanatory view illustrating the formation processing method of the image. Specifically, a relative positional relationship between the virtual nozzle columns 950 and the sheets at the time of respective dot forming operations are illustrated.

In the embodiment, the apparatus will be described, using the virtual nozzle columns 950 configured of the first nozzle group 950a, the second nozzle group 950b, the third nozzle group 950c, and the fourth nozzle group 950d as an example. To simplify a description, the number of the nozzles 43 of the respective first to fourth nozzle groups 950a, 950b, 950c, and 950d is set to be 12 pieces. Specifically, a nozzle number of a nozzle 43 at a most upstream side in the sub scanning direction of the first nozzle group 950a is denoted as #1. The nozzle number is denoted in order along the downstream side in the sub scanning direction of the first nozzle group 950a. The nozzle number of the nozzle 43 at the most downstream side in the sub scanning direction of the first nozzle group 950a is denoted as #12. A nozzle number of a nozzle 43 at the most upstream side in the sub scanning direction of the second nozzle group 950b arranged at the downstream side in the sub scanning direction of the first nozzle group 950a is denoted as #13. The nozzle number is denoted in order along the downstream side in the sub scanning direction of the second nozzle group 950b. The nozzle number of the nozzle 43 at the most downstream side in the sub scanning direction of the second nozzle group 950b is denoted as #24. A nozzle number of a nozzle 43 at the most upstream side in the sub scanning direction of the third nozzle group 950c arranged at the downstream side in the sub scanning direction of the second nozzle group 950b is denoted as #25. The nozzle number is denoted in order along the downstream side in the sub scanning direction of the third nozzle group 950c. The nozzle number of the nozzle 43 at the most downstream side in the sub scanning direction of the third nozzle group 950c is denoted as #36. A nozzle number of a nozzle 43 at the most upstream side in the sub scanning direction of the fourth nozzle group 950d arranged at the downstream side in the sub scanning direction of the third nozzle group 950c is denoted as #37. The nozzle number is denoted in order along the downstream side in the sub scanning direction of the fourth nozzle group 950d. The nozzle number of the nozzle 43 at the most downstream side in the sub scanning direction of the fourth nozzle group 950d is denoted as #48.

A control unit 60 forms the raster lines by controlling a transporting unit 20, a carriage unit 30 as a main scanning unit, and a head unit 40. In the embodiment, a case where the raster lines are formed in the path 6 will be described.

In FIG. 13, although it is illustrated as if the nozzle columns 950 move with respect to the sheet, the sheet actually moves in a transportation direction. In the embodiment, in a transportation operation to be performed between the path and the path, the sheet is transported in the sub scanning direction so as to correspond to a transportation amount for eight dots. A dot (image) is formed by the paths 1 to 6. Thereafter, similarly, the dot (image) is formed by the paths 2 to 7.

Here, the nozzle usage rates of the respective first to fourth nozzle groups 950a, 950b, 950c, and 950d in a band region Ba' (refer to FIG. 14) according to the liquid ejecting method of the embodiment will be described. The band region Ba' is referred to as an arrangement region of the nozzle 43 of the respective first to fourth nozzle groups 950a, 950b, 950c, and 950d corresponding to the raster lines completed in the path 6.

The nozzle usage rate of the first nozzle group 950a refers to a ratio of the number of dots of which the first nozzle group 950a contributes with respect to the total number of dots of a single raster line to be formed (for example, raster line L1). That is, it refers to the ratio of the number of dots of all the nozzles 43 of the first nozzle group 950a that contribute to the formation of the raster line L1.

Similarly, the nozzle usage rate of the second nozzle group 950b refers to a ratio of the number of dots of which the second nozzle group 950b contributes with respect to the total number of dots of a single raster line to be formed (for example, raster line L1). That is, it refers to the ratio of the number of dots of all the nozzles 43 of the second nozzle group 950b that contribute to the formation of the raster line L1.

Similarly, the nozzle usage rate of the third nozzle group 950c refers to a ratio of the number of dots of which the third nozzle group 950c contributes with respect to the total number of dots of a single raster line to be formed (for example, raster line L1). That is, it refers to the ratio of the number of dots of all the nozzles 43 of the third nozzle group 950c that contribute to the formation of the raster line L1.

Similarly, the nozzle usage rate of the fourth nozzle group 950d refers to a ratio of the number of dots of which the fourth nozzle group 950d contributes with respect to the total number of dots of a single raster line to be formed (for example, raster line L1). That is, it refers to the ratio of the number of dots of all the nozzles 43 of the fourth nozzle group 950d that contribute to the formation of the raster line L1.

Figure 14:
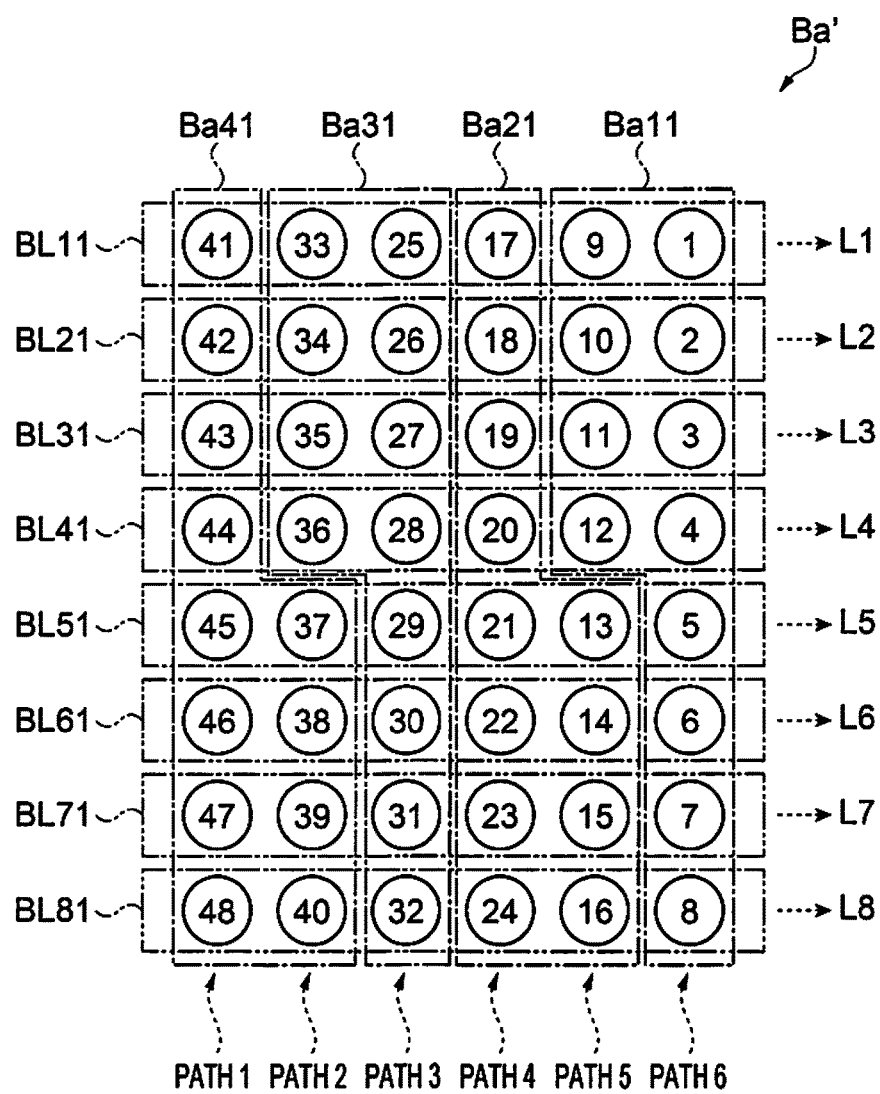
FIG. 14 is an explanatory view illustrating a corresponding nozzle in a band region according to the second embodiment.
Figure 15:
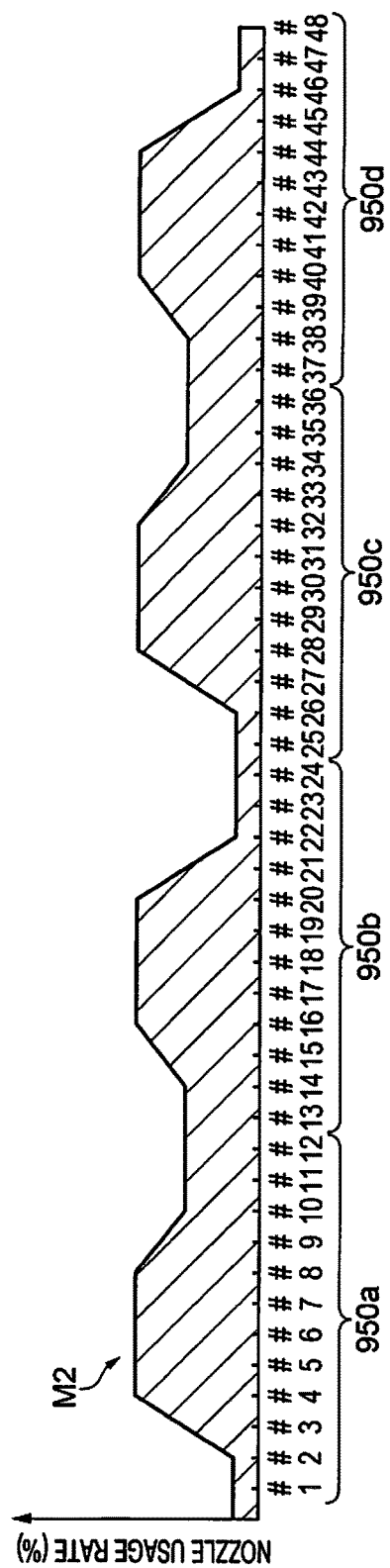
FIG. 15 is a view illustrating a mask pattern according to the second embodiment.
Figure 16:
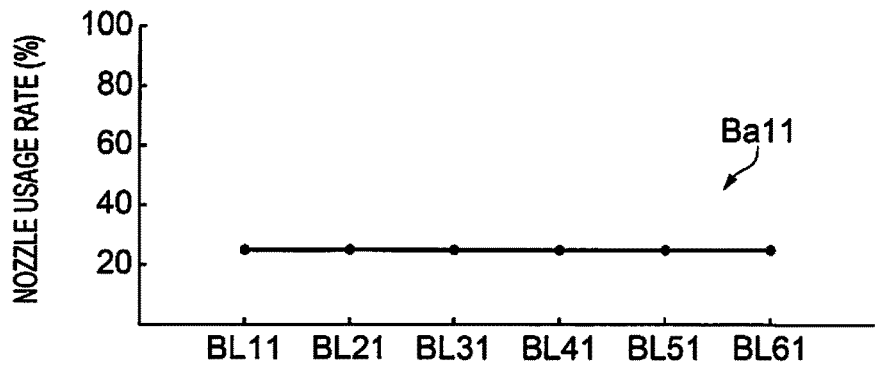
FIG. 16 is a view illustrating a nozzle usage rate of a first nozzle group in a first band region according to the second embodiment.
Figure 17:
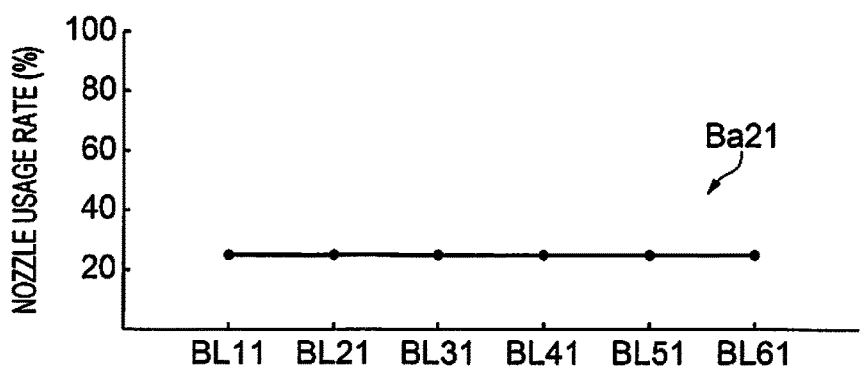
FIG. 17 is a view illustrating a nozzle usage rate of a second nozzle group in a second band region according to the second embodiment.
Figure 18:
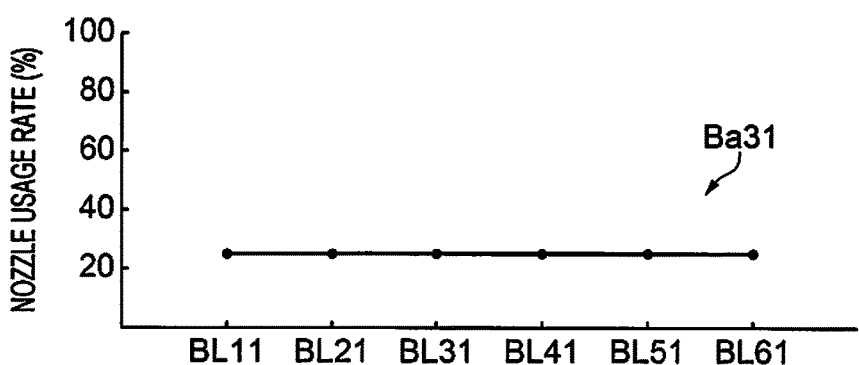
FIG. 18 is a view illustrating a nozzle usage rate of a third nozzle group in a third band region according to the second embodiment.
Figure 19:
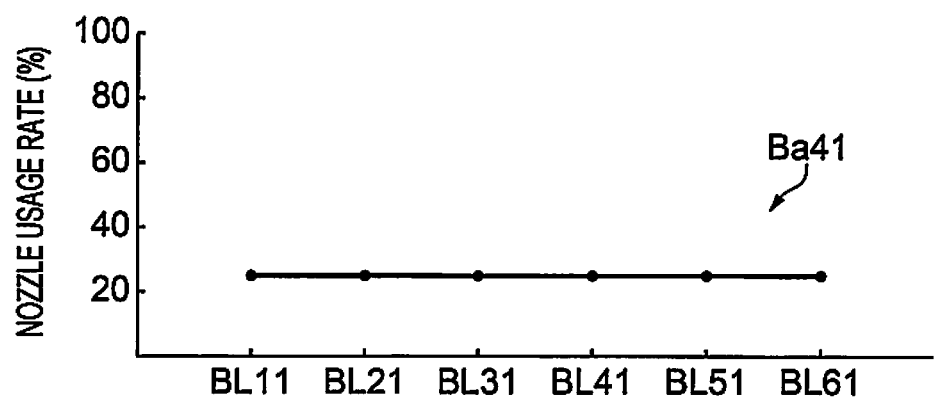
FIG. 19 is a view illustrating a nozzle usage rate of a fourth nozzle group in a fourth band region according to the second embodiment.

FIG. 14 is an explanatory view illustrating the corresponding nozzle in the band region, and FIG. 15 is a view illustrating the mask pattern. FIG. 16 is a view illustrating the nozzle usage rate of the first nozzle group in the band region. FIG. 17 is a view illustrating the nozzle usage rate of the second nozzle group in the band region. FIG. 18 is a view illustrating the nozzle usage rate of the third nozzle group in the band region. FIG. 19 is a view illustrating the nozzle usage rate of the fourth nozzle group in the band region. In FIG. 14, the nozzle numbers #1 to #48 in the respective nozzles 43 are denoted.

As illustrated in FIGS. 13 and 14, the band region Ba' is configured of a first band region Ba11 where the nozzle 43 (from nozzle numbers #1 to #12) of the first nozzle group 950a corresponds, a second band region Ba21 where the nozzle 43 (from nozzle numbers #13 to #24) of the second nozzle group 950b corresponds, a third band region Ba31 where the nozzle 43 (from nozzle numbers #25 to #36) of the third nozzle group 950c corresponds, and a fourth band region Ba41 where the nozzle 43 (from nozzle numbers #37 to #48) of the fourth nozzle group 950*d* corresponds.

The raster line L1 is corresponded to a first band line BL11 in the main scanning direction. Here, the first band line BL11 is distributed to two nozzles 43 (nozzles #1 and #9) of the first nozzle group 950*a*, one nozzle 43 (nozzle #17) of the second nozzle group 950*b*, two nozzles 43 (nozzles #25 and #33) of the third nozzle group 950*c*, and one nozzle 43 (nozzle #41) of the fourth nozzle group 950*d*.

The raster line L2 is corresponded to a second band line BL21 in the main scanning direction. Here, the second band line BL21 is distributed to two nozzles 43 (nozzles #2 and #10) of the first nozzle group 950*a*, one nozzle 43 (nozzle #18) of the second nozzle group 950*b*, two nozzles 43 (nozzles #26 and #34) of the third nozzle group 950*c*, and one nozzle 43 (nozzle #42) of the fourth nozzle group 950*d*.

The raster line L3 is corresponded to a third band line BL31 in the main scanning direction. Here, the third band line BL31 is distributed to two nozzles 43 (nozzles #3 and #11) of the first nozzle group 950*a*, one nozzle 43 (nozzle #19) of the second nozzle group 950*b*, two nozzles 43 (nozzles #27 and #35) of the third nozzle group 950*c*, and one nozzle 43 (nozzle #43) of the fourth nozzle group 950*d*.

The raster line L4 is corresponded to a fourth band line BL41 in the main scanning direction. Here, the fourth band line BL41 is distributed to two nozzles 43 (nozzles #4 and #12) of the first nozzle group 950*a*, one nozzle 43 (nozzle #20) of the second nozzle group 950*b*, two nozzles 43 (nozzles #28 and #36) of the third nozzle group 950*c*, and one nozzle 43 (nozzle #44) of the fourth nozzle group 950*d*.

The raster line L5 is corresponded to a fifth band line BL51 in the main scanning direction. Here, the fifth band line BL51 is distributed to one nozzle 43 (nozzle #5) of the first nozzle group 950*a*, two nozzles 43 (nozzles #13 and #21) of the second nozzle group 950*b*, one nozzle 43 (nozzle #29) of the third nozzle group 950*c*, and two nozzles 43 (nozzles #37 and #45) of the fourth nozzle group 950*d*.

The raster line L6 is corresponded to a sixth band line BL61 in the main scanning direction. Here, the sixth band line BL61 is distributed to one nozzle 43 (nozzle #6) of the first nozzle group 950*a*, two nozzles 43 (nozzles #14 and #22) of the second nozzle group 950*b*, one nozzle 43 (nozzle #30) of the third nozzle group 950*c*, and two nozzles 43 (nozzles #38 and #46) of the fourth nozzle group 950*d*.

The raster line L7 is corresponded to a seventh band line BL71 in the main scanning direction. Here, the seventh band line BL71 is distributed to one nozzle 43 (nozzle #7) of the first nozzle group 950*a*, two nozzles 43 (nozzles #15 and #23) of the second nozzle group 950*b*, one nozzle 43 (nozzle #31) of the third nozzle group 950*c*, and two nozzles 43 (nozzles #39 and #47) of the fourth nozzle group 950*d*.

The raster line L8 is corresponded to an eighth band line BL81 in the main scanning direction. Here, the eighth band line BL81 is distributed to one nozzle 43 (nozzle #8) of the first nozzle group 950*a*, two nozzles 43 (nozzles #16 and #24) of the second nozzle group 950*b*, one nozzle 43 (nozzle #32) of the third nozzle group 950*c*, and two nozzles 43 (nozzles #40 and #48) of the fourth nozzle group 950*d*.

When the liquid is ejected from the first nozzle group 950*a*, the second nozzle group 950*b*, the third nozzle group 950*c*, and the fourth nozzle group 950*d* forming the band region Ba' to form a plurality of the raster lines (from the raster line L1 to the raster line L8) on the sheet 10, the control unit 60 maintains a fixed value for the total value of the nozzle usage rate of the first nozzle group 950*a* corresponding to the respective raster lines (from the raster line L1 to the raster line L8), maintains a fixed value for the total value of the nozzle usage rate of the second nozzle group 950*b* corresponding to the respective raster lines (from the raster line L1 to the raster line L8), and maintains a fixed value for the total value of the nozzle usage rate of the third nozzle group 950*c* corresponding to the respective raster lines (from the raster line L1 to the raster line L8). Furthermore, the control unit 60 maintains a fixed value for the total value of the nozzle usage rate of the fourth nozzle group 950*d* corresponding to the respective raster lines (from the raster line L1 to the raster line L8). Specifically, as illustrated in FIG. 15, based on the mask pattern M2 in which the total value of the nozzle usage rate of the first nozzle group 950*a* is fixed, the total value of the nozzle usage rate of the second nozzle group 950*b* is fixed, and the total value of the nozzle usage rate of the third nozzle group 950*c* is fixed, furthermore, the total value of the nozzle usage rate of the fourth nozzle group 950*d* is fixed, the ink is ejected from the respective nozzles 43 (from nozzle #1 to nozzle #48). The mask pattern M2 is a pattern the nozzle usage rate is allocated to each nozzle 43 (from nozzle #1 to nozzle #48). Thereby, the respective raster lines (from the raster line L1 to the raster line L8) based on the nozzle usage rate defined with respect to the respective nozzles 43 (from nozzle #1 to nozzle #48) are formed. Here, in the mask pattern M2, the nozzle usage rate of the first nozzle group 950*a* is fixed from a center of the first nozzle group 950*a* to the predetermined position, and is set to decrease from the predetermined position toward an end nozzle (nozzle #1 and nozzle #12) of the first nozzle group 950*a*. The nozzle usage rate of the second nozzle group 950*b* is fixed from a center of the second nozzle group 950*b* to the predetermined position, and is set to decrease from the predetermined position toward an end nozzle (nozzle #13 and nozzle #24) of the second nozzle group 950*b*. The nozzle usage rate of the third nozzle group 950*c* is fixed from a center of the third nozzle group 950*c* to the predetermined position, and is set to decrease from the predetermined position toward an end nozzle (nozzle #25 and nozzle #36) of the third nozzle group 950*c*. Similarly, the nozzle usage rate of the fourth nozzle group 950*d* is fixed from a center of the fourth nozzle group 950*d* to the predetermined position, and is set to decrease from the predetermined position toward an end nozzle (nozzle #37 and nozzle #48) of the fourth nozzle group 950*d*. This is to ensure the ejection stability.

FIG. 16 is a view illustrating the nozzle usage rate of the respective band regions (from Ba11 to Ba81) in a case where the ink is ejected from the respective nozzles 43 (from nozzle #1 to nozzle #48), based on the mask pattern M2. In the embodiment, as illustrated in FIG. 16, the nozzle usage rate of the first nozzle group 950*a* in the first band region Ba11 and the total values of the nozzle usage rate in the first band line BL11 to the eighth band line BL81 are fixed. In the embodiment, the total value of the nozzle usage rate of the respective band lines BL (from the first band line BL11 to the eighth band line BL81) is approximately 25% and fixed.

In detail, the total value of the nozzle usage rate of two nozzles 43 (nozzles #1 and #9) of the first nozzle group 950*a* corresponding to the first band line BL11 is approximately 25%.

The total value of the nozzle usage rate of two nozzles 43 (nozzles #2 and #10) of the first nozzle group 950*a* corresponding to the second band line BL21 is approximately 25%.

The total value of the nozzle usage rate of two nozzles 43 (nozzles #3 and #11) of the first nozzle group 950*a* corresponding to the third band line BL31 is approximately 25%.

The total value of the nozzle usage rate of two nozzles 43 (nozzles #4 and #12) of the first nozzle group 950a corresponding to the fourth band line BL41 is approximately 25%.

The total value of the nozzle usage rate of one nozzle 43 (nozzle #5) of the first nozzle group 950a corresponding to the fifth band line BL51 is approximately 25%.

The total value of the nozzle usage rate of one nozzle 43 (nozzle #6) of the first nozzle group 950a corresponding to the sixth band line BL61 is approximately 25%.

The total value of the nozzle usage rate of one nozzle 43 (nozzle #7) of the first nozzle group 950a corresponding to the seventh band line BL71 is approximately 25%.

The total value of the nozzle usage rate of one nozzle 43 (nozzle #8) of the first nozzle group 950a corresponding to the eighth band line BL81 is approximately 25%.

According to the above, in the first band region Ba11 (refer to FIG. 14) configuring by the first band line BL11 to the eighth band line BL81 to which the first nozzle group 950a corresponds, since the total value of the nozzle usage rate is 25% and fixed, in-plane contrast of the image formed in the first band region Ba11 is uniform. As illustrated in FIG. 16, the total values of the nozzle usage rate of the nozzle 43 of the first nozzle group 950a corresponding to the respective first to eighth band lines BL11, BL21, BL31, BL41, BL51, BL61, BL71, and BL81 are also mentioned to be identical to each other.

As illustrated in FIG. 17, the nozzle usage rate of the second nozzle group 950b in the second band region Ba21 and the total value of the nozzle usage rate in the first band line BL11 to the eighth band line BL81 are fixed. In the embodiment, the total value of the nozzle usage rate of the respective band lines BL (from the first band line BL11 to the eighth band line BL81) is approximately 25% and fixed.

In detail, the total value of the nozzle usage rate of one nozzle 43 (nozzle #17) of the second nozzle group 950b corresponding to the first band line BL11 is approximately 25%.

The total value of the nozzle usage rate of one nozzle 43 (nozzle #18) of the second nozzle group 950b corresponding to the second band line BL21 is approximately 25%.

The total value of the nozzle usage rate of one nozzle 43 (nozzle #19) of the second nozzle group 950b corresponding to the third band line BL31 is approximately 25%.

The total value of the nozzle usage rate of one nozzle 43 (nozzle #20) of the second nozzle group 950b corresponding to the fourth band line BL41 is approximately 25%.

The total value of the nozzle usage rate of two nozzles 43 (nozzles #13 and #21) of the second nozzle group 950b corresponding to the fifth band line BL51 is approximately 25%.

The total value of the nozzle usage rate of two nozzles 43 (nozzles #14 and #22) of the second nozzle group 950b corresponding to the sixth band line BL61 is approximately 25%.

The total value of the nozzle usage rate of two nozzles 43 (nozzles #15 and #23) of the second nozzle group 950b corresponding to the seventh band line BL71 is approximately 25%.

The total value of the nozzle usage rate of two nozzles 43 (nozzles #16 and #24) of the second nozzle group 950b corresponding to the eighth band line BL81 is approximately 25%.

According to the above, in the second band region Ba21 (refer to FIG. 14) configuring by the first band line BL11 to the eighth band line BL81 to which the second nozzle group 950b corresponds, since the total value of the nozzle usage rate is 25% and fixed, in-plane contrast of the image formed in the second band region Ba21 is uniform. As illustrated in FIG. 17, the total values of the nozzle usage rate of the nozzle 43 of the second nozzle group 950b corresponding to the respective first to eighth band lines BL11, BL21, BL31, BL41, BL51, BL61, BL71, and BL81 are also mentioned to be identical to each other.

As illustrated in FIG. 18, the nozzle usage rate of the third nozzle group 950c in the third band region Ba31 and the total value of the nozzle usage rate in the first band line BL11 to the eighth band line BL81 are fixed. In the embodiment, the total value of the nozzle usage rate of the respective band lines BL (from the first band line BL11 to the eighth band line BL81) is approximately 25% and fixed.

In detail, the total value of the nozzle usage rate of two nozzles 43 (nozzles #25 and #33) of the third nozzle group 950c corresponding to the first band line BL11 is approximately 25%.

The total value of the nozzle usage rate of two nozzles 43 (nozzles #26 and #34) of the third nozzle group 950c corresponding to the second band line BL21 is approximately 25%.

The total value of the nozzle usage rate of two nozzles 43 (nozzles #27 and #35) of the third nozzle group 950c corresponding to the third band line BL31 is approximately 25%.

The total value of the nozzle usage rate of two nozzles 43 (nozzles #28 and #36) of the third nozzle group 950c corresponding to the fourth band line BL41 is approximately 25%.

The total value of the nozzle usage rate of one nozzle 43 (nozzle #29) of the third nozzle group 950c corresponding to the fifth band line BL51 is approximately 25%.

The total value of the nozzle usage rate of one nozzle 43 (nozzle #30) of the third nozzle group 950c corresponding to the sixth band line BL61 is approximately 25%.

The total value of the nozzle usage rate of one nozzle 43 (nozzle #31) of the third nozzle group 950c corresponding to the seventh band line BL71 is approximately 25%.

The total value of the nozzle usage rate of one nozzle 43 (nozzle #32) of the third nozzle group 950c corresponding to the eighth band line BL81 is approximately 25%.

According to the above, in the third band region Ba31 (refer to FIG. 14) configuring by the first band line BL11 to the eighth band line BL81 to which the third nozzle group 950c corresponds, since the total value of the nozzle usage rate is 25% and fixed, in-plane contrast of the image formed in the third band region Ba31 is uniform. Accordingly, contrast unevenness is hardly visible. As illustrated in FIG. 18, the total values of the nozzle usage rate of the nozzle 43 of the third nozzle group 950c corresponding to the respective first to eighth band lines BL11, BL21, BL31, BL41, BL51, BL61, BL71, and BL81 are also mentioned to be identical to each other.

As illustrated in FIG. 19, the nozzle usage rate of the fourth nozzle group 950d in the fourth band region Ba41 and the total value of the nozzle usage rate in the first band line BL11 to the eighth band line BL81 are fixed. In the embodiment, the total value of the nozzle usage rate of the respective band lines BL (from the first band line BL11 to the eighth band line BL81) is approximately 25% and fixed.

In detail, the total value of the nozzle usage rate of one nozzle 43 (nozzle #41) of the fourth nozzle group 950d corresponding to the first band line BL11 is approximately 25%.

The total value of the nozzle usage rate of one nozzle 43 (nozzle #42) of the fourth nozzle group 950*d* corresponding to the second band line BL21 is approximately 25%.

The total value of the nozzle usage rate of one nozzle 43 (nozzle #43) of the fourth nozzle group 950*d* corresponding to the third band line BL31 is approximately 25%.

The total value of the nozzle usage rate of one nozzle 43 (nozzle #44) of the fourth nozzle group 950*d* corresponding to the fourth band line BL41 is approximately 25%.

The total value of the nozzle usage rate of two nozzles 43 (nozzles #37 and #45) of the fourth nozzle group 950*d* corresponding to the fifth band line BL51 is approximately 25%.

The total value of the nozzle usage rate of two nozzles 43 (nozzles #38 and #46) of the fourth nozzle group 950*d* corresponding to the sixth band line BL61 is approximately 25%.

The total value of the nozzle usage rate of two nozzles 43 (nozzles #39 and #47) of the fourth nozzle group 950*d* corresponding to the seventh band line BL71 is approximately 25%.

The total value of the nozzle usage rate of two nozzles 43 (nozzles #40 and #48) of the fourth nozzle group 950*d* corresponding to the eighth band line BL81 is approximately 25%.

According to the above, in the fourth band region Ba41 (refer to FIG. 14) configuring by the first band line BL11 to the eighth band line BL81 to which the fourth nozzle group 950*d* corresponds, since the total value of the nozzle usage rate is 25% and fixed, in-plane contrast of the image formed in the fourth band region Ba41 is uniform. As illustrated in FIG. 19, the total values of the nozzle usage rate of the nozzle 43 of the fourth nozzle group 950*d* corresponding to the respective first to eighth band lines BL11, BL21, BL31, BL41, BL51, BL61, BL71, and BL81 are also mentioned to be identical to each other.

Hereinbefore, since the respective total values of the nozzle usage rate are identical in the respective first to fourth band regions Ba11, Ba21, Ba31, and Ba41, and since the in-plane contrast is formed by combination of the uniformized image, contrast unevenness is hardly visible in the image formed by the band region Ba configuring of the first to fourth band regions Ba11, Ba21, Ba31, and Ba41.

In the embodiment, in the respective first to fourth band regions Ba11, Ba21, Ba31, and Ba41, the respective total values of the nozzle usage rates is fixed, and the total value of the nozzle usage rate of the first nozzle group 950*a* corresponding to the respective raster lines (from the raster line L1 to the raster line L8), the total value of the nozzle usage rate of the second nozzle group 950*b* corresponding to the respective raster lines (from the raster line L1 to the raster line L8), the total value of the nozzle usage rate of the third nozzle group 950*c* corresponding to the respective raster lines (from the raster line L1 to the raster line L8), and the total value of the nozzle usage rate of the fourth nozzle group 950*d* corresponding to the respective raster lines (from the raster line L1 to the raster line L8) are identical to each other.

Specifically, the total value of the nozzle usage rate of two nozzles 43 (nozzle #1 and #9) of the first nozzle group 950*a* of the first band line BL11 corresponding to the raster line L1 is approximately 25%, the total value of the nozzle usage rate of one nozzle 43 (nozzle #17) of the second nozzle group 950*b* corresponding to the first band line BL11 is approximately 25%, the total value of the nozzle usage rate of two nozzles 43 (nozzles #25 and #33) of the third nozzle group 950*c* corresponding to the first band line BL11 is approximately 25%, and the total value of the nozzle usage rate of one nozzle 43 (nozzle #41) of the fourth nozzle groups 950*d* corresponding to the first band line BL11 is approximately 25%. Accordingly, the total values of the nozzle usage rate of the respective first to fourth nozzle groups 950*a*, 950*b*, 950*c*, and 950*d* are identical to each other in the first band line BL11 corresponding to the raster line L1. The total value of the nozzle usage rate of the nozzles 43 of the respective first to fourth nozzle groups 950*a*, 950*b*, 950*c*, and 950*d* is also mentioned to be fixed with respect to the first band line BL11 corresponding to the raster line L1.

The total value of the nozzle usage rate of two nozzles 43 (nozzles #2 and #10) of the first nozzle group 950*a* of the second band line BL21 corresponding to the raster line L2 is approximately 25%, the total value of the nozzle usage rate of one nozzle 43 (nozzle #18) of the second nozzle group 950*b* corresponding to the second band line BL21 is approximately 25%, the total value of the nozzle usage rate of two nozzles 43 (nozzles #26 and #34) of the third nozzle group 950*c* corresponding to the second band line BL21 is approximately 25%, and the total value of the nozzle usage rate of one nozzle 43 (nozzle #42) of the fourth nozzle groups 950*d* corresponding to the second band line BL21 is approximately 25%. Accordingly, the total values of the nozzle usage rate of the respective first to fourth nozzle groups 950*a*, 950*b*, 950*c*, and 950*d* are identical to each other in the second band line BL21 corresponding to the raster line L2. The total value of the nozzle usage rate of the nozzles 43 of the respective first to fourth nozzle groups 950*a*, 950*b*, 950*c*, and 950*d* is also mentioned to be fixed with respect to the second band line BL21 corresponding to the raster line L2.

The total value of the nozzle usage rate of two nozzles 43 (nozzles #3 and #11) of the first nozzle group 950*a* of the third band line BL31 corresponding to the raster line L3 is approximately 25%, the total value of the nozzle usage rate of one nozzle 43 (nozzle #19) of the second nozzle group 950*b* corresponding to the third band line BL31 is approximately 25%, the total value of the nozzle usage rate of two nozzles 43 (nozzles #27 and #35) of the third nozzle group 950*c* corresponding to the third band line BL31 is approximately 25%, and the total value of the nozzle usage rate of one nozzle 43 (nozzle #43) of the fourth nozzle groups 950*d* corresponding to the third band line BL31 is approximately 25%. Accordingly, the total values of the nozzle usage rate of the respective first to fourth nozzle groups 950*a*, 950*b*, 950*c*, and 950*d* are identical to each other in the third band line BL31 corresponding to the raster line L3. The total value of the nozzle usage rate of the nozzles 43 of the respective first to fourth nozzle groups 950*a*, 950*b*, 950*c*, and 950*d* is also mentioned to be fixed with respect to the third band line BL31 corresponding to the raster line L3.

The total value of the nozzle usage rate of two nozzles 43 (nozzles #4 and #12) of the first nozzle group 950*a* of the fourth band line BL41 corresponding to the raster line L4 is approximately 25%, the total value of the nozzle usage rate of one nozzle 43 (nozzle #20) of the second nozzle group 950*b* corresponding to the fourth band line BL41 is approximately 25%, the total value of the nozzle usage rate of two nozzles 43 (nozzles #28 and #36) of the third nozzle group 950*c* corresponding to the fourth band line BL41 is approximately 25%, and the total value of the nozzle usage rate of one nozzle 43 (nozzle #44) of the fourth nozzle groups 950*d* corresponding to the fourth band line BL41 is approximately 25%. Accordingly, the total values of the nozzle usage rate of the respective first to fourth nozzle groups 950*a*, 950*b*, 950c, and 950d are identical to each other in the fourth band line BL41 corresponding to the raster line L4. The total value of the nozzle usage rate of the nozzles 43 of the respective first to fourth nozzle groups 950a, 950b, 950c, and 950d is also mentioned to be fixed with respect to the fourth band line BL41 corresponding to the raster line L4.

The total value of the nozzle usage rate of one nozzle 43 (nozzle #5) of the first nozzle group 950a of the fifth band line BL51 corresponding to the raster line L5 is approximately 25%, the total value of the nozzle usage rate of two nozzles 43 (nozzles #13 and #21) of the second nozzle group 950b corresponding to the fifth band line BL51 is approximately 25%, the total value of the nozzle usage rate of one nozzle 43 (nozzle #29) of the third nozzle group 950c corresponding to the fifth band line BL51 is approximately 25%, and the total value of the nozzle usage rate of two nozzles 43 (nozzles #37 and #45) of the fourth nozzle groups 950d corresponding to the fifth band line BL51 is approximately 25%. Accordingly, the total values of the nozzle usage rate of the respective first to fourth nozzle groups 950a, 950b, 950c, and 950d are identical to each other in the fifth band line BL51 corresponding to the raster line L5. The total values of the nozzle usage rate of the nozzles 43 of the respective first to fourth nozzle groups 950a, 950b, 950c, and 950d are also mentioned to be fixed with respect to the fifth band line BL51 corresponding to the raster line L5.

The total value of the nozzle usage rate of one nozzle 43 (nozzle #6) of the first nozzle group 950a of the sixth band line BL61 corresponding to the raster line L6 is approximately 25%, the total value of the nozzle usage rate of two nozzles 43 (nozzles #14 and #22) of the second nozzle group 950b corresponding to the sixth band line BL61 is approximately 25%, the total value of the nozzle usage rate of one nozzle 43 (nozzle #30) of the third nozzle group 950c corresponding to the sixth band line BL61 is approximately 25%, and the total value of the nozzle usage rate of two nozzles 43 (nozzles #38 and #46) of the fourth nozzle groups 950d corresponding to the sixth band line BL61 is approximately 25%. Accordingly, the total values of the nozzle usage rate of the respective first to fourth nozzle groups 950a, 950b, 950c, and 950d are identical to each other in the sixth band line BL61 corresponding to the raster line L6. The total values of the nozzle usage rate of the nozzles 43 of the respective first to fourth nozzle groups 950a, 950b, 950c, and 950d are also mentioned to be fixed with respect to the sixth band line BL61 corresponding to the raster line L6.

The total value of the nozzle usage rate of one nozzle 43 (nozzle #7) of the first nozzle group 950a of the seventh band line BL71 corresponding to the raster line L7 is approximately 25%, the total value of the nozzle usage rate of two nozzles 43 (nozzles #15 and #23) of the second nozzle group 950b corresponding to the seventh band line BL71 is approximately 25%, the total value of the nozzle usage rate of one nozzle 43 (nozzle #31) of the third nozzle group 950c corresponding to the seventh band line BL71 is approximately 25%, and the total value of the nozzle usage rate of two nozzles 43 (nozzles #39 and #47) of the fourth nozzle groups 950d corresponding to the seventh band line BL71 is approximately 25%. Accordingly, the total values of the nozzle usage rate of the respective first to fourth nozzle groups 950a, 950b, 950c, and 950d are identical to each other in the seventh band line BL71 corresponding to the raster line L7. The total values of the nozzle usage rate of the nozzles 43 of the respective first to fourth nozzle groups 950a, 950b, 950c, and 950d are also mentioned to be fixed with respect to the seventh band line BL71 corresponding to the raster line L7.

The total value of the nozzle usage rate of one nozzle 43 (nozzle #8) of the first nozzle group 950a of the eighth band line BL81 corresponding to the raster line L8 is approximately 25%, the total value of the nozzle usage rate of two nozzles 43 (nozzles #16 and #24) of the second nozzle group 950b corresponding to the eighth band line BL81 is approximately 25%, the total value of the nozzle usage rate of one nozzle 43 (nozzle #32) of the third nozzle group 950c corresponding to the eighth band line BL81 is approximately 25%, and the total value of the nozzle usage rate of two nozzles 43 (nozzles #40 and #48) of the fourth nozzle groups 950d corresponding to the eighth band line BL81 is approximately 25%. Accordingly, the total values of the nozzle usage rate of the respective first to fourth nozzle groups 950a, 950b, 950c, and 950d are identical to each other in the eighth band line BL81 corresponding to the raster line L8. The total values of the nozzle usage rate of the nozzles 43 of the respective first to fourth nozzle groups 950a, 950b, 950c, and 950d are also mentioned to be fixed with respect to the eighth band line BL81 corresponding to the raster line L8.

According to the above, the total value of the nozzle usage rate of the nozzle 43 of the first nozzle group 950a, the total value of the nozzle usage rate of the nozzle 43 of the second nozzle group 950b, the total value of the nozzle usage rate of the nozzle 43 of the third nozzle group 950c, and the total value of the nozzle usage rate of the nozzle 43 of the fourth nozzle group 950d are identical to each other in the respective raster lines (for example, from the raster line L1 to the raster line L8). That is, the nozzle usage rate of the respective first to fourth nozzle groups 950a, 950b, 950c, and 950d are uniformly distributed with respect to the respective raster lines. Thereby, it is possible to further improve the image quality.

Hereinbefore, according to the above embodiment, it is possible to obtain the following effects.

Since the total value of the nozzle usage rate in the respective first to fourth band regions Ba11, Ba21, Ba31, and Ba41 in the band region Ba' is fixed, the image formed by the band region Ba' normally has fixed density. Therefore, the contrast unevenness is hardly visible. Since the total value of the nozzle usage rate of the respective first to fourth band regions Ba11, Ba21, Ba31, and Ba41 are identical to each other, it is possible to further improve the image quality.

For example, even in a case where positions between the respective first to fourth heads 410a, 410b, 410c, and 410d are shifted, since the total value of the nozzle usage rate in the respective first to fourth band regions Ba11, Ba21, Ba31 and Ba41 is fixed, the in-plane combination in which the image is formed is equal. Therefore, it is possible to reduce the contrast unevenness of the image.

The invention is not limited to the embodiments described above, and it is possible to add various changes or improvements to the embodiments described above. A modification example will be described hereinafter.

Modification Example 1

Although the first and second embodiment described above have a configuration provided with a plurality of the heads 41 (410), these are not limited thereto. For example, the head may be one. In this case, for the nozzle columns configuring a plurality of nozzles disposed in one head, the first nozzle group and the second nozzle group may be configured. That is, it may be configured to be provide with a plurality of nozzle groups, and to form the respective raster lines with the path number of equal to or greater than the number of the nozzle group. Even in this case, it is possible to obtain the same effect described-above.

Modification Example 2

In the liquid ejecting method (image forming processing method) in the above first embodiment, although a multi path recording method (Full POL) in which the respective raster lines L (from L1 to L6) are configured with a plurality of paths (path 8) is applied, the intervention is not limited thereto, and a multi path recording method including a partial overlapping (POL) may be applied. Even in this case, it is possible to obtain the same effects described-above.

This application claims priority under 35 U.S.C. § 119 to Japanese Patent Application No. 2016-000396, filed Jan. 5, 2016. The entire disclosure of Japanese Patent Application No. 2016-000396 is hereby incorporated herein by reference.

What is claimed is:

1. A liquid ejecting apparatus comprising:
a head in which a first nozzle group, a second nozzle group, and a third nozzle group which have a plurality of nozzles are disposed in a predetermined direction, and that ejects a liquid on a medium, the second nozzle group differing from the first nozzle group, the third nozzle group differing from the first nozzle group and the second nozzle group;
a main scanning unit that scans the head in a main scanning direction;
a sub scanning unit that relatively moves the head and the medium in a sub scanning direction intersecting the main scanning direction; and
a control unit,
wherein when the liquid is ejected to form a plurality of raster lines on the medium with each of the raster lines being formed by dots ejected from at least one of the nozzles of the first nozzle group, at least one of the nozzles of the second nozzle group and at least one of the nozzles of the third nozzle group, the control unit sets a total value of a nozzle usage rate of the first nozzle group in each of the raster lines to be a first fixed value, a total value of a nozzle usage rate of the second nozzle group in each of the raster lines to be a second fixed value, and a total value of a nozzle usage rate of the third nozzle group in each of the raster lines to be a third fixed value, and
wherein the nozzle usage rate of the first nozzle group is fixed from a center of the first nozzle group to a predetermined position, and decreases from the predetermined position toward an end nozzle of the first nozzle group.

2. The liquid ejecting apparatus according to claim 1, wherein the first fixed value, the second fixed value, and the third fixed value are identical to each other.

3. The liquid ejecting apparatus according to claim 1, wherein the nozzle usage rate of the end nozzle is zero.

4. The liquid ejecting apparatus according to claim 1, wherein the head is further provided with a fourth nozzle group which has a plurality of the nozzles.

5. A liquid ejecting method of a liquid ejecting apparatus including a head in which a first nozzle group, a second nozzle group, and a third nozzle group each having a plurality of nozzles that eject a liquid on a medium are disposed in a predetermined direction, a main scanning unit that scans the head in a main scanning direction, a sub scanning unit that relatively moves the head and the medium in a sub scanning direction intersecting the main scanning direction, and a control unit, the second nozzle group differing from the first nozzle group, the third nozzle group differing from the first nozzle group and the second nozzle group, the method comprising:
when the liquid is ejected to form a plurality of raster lines on the medium with each of the raster lines being formed by dots ejected from at least one of the nozzles of the first nozzle group, at least one of the nozzles of the second nozzle group and at least one of the nozzles of the third nozzle group, setting a total value of a nozzle usage rate of the first nozzle group in each of the raster lines to be a first fixed value, a total value of a nozzle usage rate of the second nozzle group in each of the raster lines to be a second fixed value, and a total value of a nozzle usage rate of the third nozzle group in each of the raster lines to be a third fixed value; and
setting the nozzle usage rate of the first nozzle group to be fixed from a center of the first nozzle group to a predetermined position, and to decrease from the predetermined position toward an end nozzle of the first nozzle group.

6. The liquid ejecting apparatus according to claim 1, wherein the nozzle usage rate of the second nozzle group is fixed from a center of the second nozzle group to a predetermined position, and decreases from the predetermined position toward an end nozzle of the second nozzle group.

7. The liquid ejecting apparatus according to claim 1, wherein the nozzle usage rate of the third nozzle group is fixed from a center of the third nozzle group to a predetermined position, and decreases from the predetermined position toward an end nozzle of the third nozzle group.

* * * * *